United States Patent
Mazumdar et al.

(10) Patent No.: US 12,430,272 B2
(45) Date of Patent: *Sep. 30, 2025

(54) DIRECT ACCESS TO EXTERNAL STORAGE FROM A RECONFIGURABLE PROCESSOR

(71) Applicant: SambaNova Systems, Inc., Palo Alto, CA (US)

(72) Inventors: Subhra Mazumdar, Palo Alto, CA (US); Guoyao Feng, Palo Alto, CA (US); Neal Sanghvi, Palo Alto, CA (US)

(73) Assignee: SambaNova Systems, Inc., Palo Alto, CA (US)

(*) Notice: Subject to any disclaimer, the term of this patent is extended or adjusted under 35 U.S.C. 154(b) by 303 days.

This patent is subject to a terminal disclaimer.

(21) Appl. No.: 18/107,994

(22) Filed: Feb. 9, 2023

(65) Prior Publication Data

US 2023/0251989 A1 Aug. 10, 2023

Related U.S. Application Data

(60) Provisional application No. 63/308,904, filed on Feb. 10, 2022.

(51) Int. Cl.
*G06F 13/20* (2006.01)
*G06F 12/06* (2006.01)
(Continued)

(52) U.S. Cl.
CPC ...... *G06F 13/4022* (2013.01); *G06F 12/0653* (2013.01); *G06F 13/382* (2013.01);
(Continued)

(58) Field of Classification Search
CPC ............ G06F 13/4022; G06F 12/0653; G06F 13/382; G06F 2213/0026;
(Continued)

(56) References Cited

U.S. PATENT DOCUMENTS 11,182,221 B1 * 11/2021 Sivaramakrishnan .. G06F 30/34
2022/0103490 A1 * 3/2022 Kim ..................... G06F 3/0664
(Continued)

FOREIGN PATENT DOCUMENTS

WO 2010142987 A1 12/2010

OTHER PUBLICATIONS

Koeplinger et al., Spatial: A Language and Compiler for Application Accelerators, PLDI '18, Jun. 18-22, 2018, Association for Computng Machinery, 16 pages.

(Continued)

*Primary Examiner* — Henry Tsai
*Assistant Examiner* — Kim T Huynh
(74) *Attorney, Agent, or Firm* — Flagship Patents; Sikander M. Khan

(57) ABSTRACT

A data processing system is presented that includes multiple local buses, a host processor, a network interface controller (NIC) for connecting to external storage via a network, one or more reconfigurable processors, and a bus switch. The bus switch couples the multiple local busses, thereby operatively coupling the one or more reconfigurable processors, the host processor, and the NIC. The one or more reconfigurable processors are configured to implement a virtual function that uses a virtual address for a memory access operation. The host processor is configured to implement an application programming interface (API) that translates the virtual address into a physical address, and the NIC uses the physical address to initiate a direct data access operation at the external storage that moves data directly between the one or more reconfigurable processors and the external storage, wherein the data bypasses the host processor.

18 Claims, 13 Drawing Sheets

(51) Int. Cl.
*G06F 13/38* (2006.01)
*G06F 13/40* (2006.01)

(52) U.S. Cl.
CPC ............ *G06F 2213/0026* (2013.01); *G06F 2213/3808* (2013.01)

(58) Field of Classification Search
CPC ..... G06F 2213/3808; G06F 2212/1016; G06F 2212/1024; G06F 2212/657; G06F 12/109; G06F 13/28
See application file for complete search history.

(56) References Cited

U.S. PATENT DOCUMENTS

| | | | | |
|---|---|---|---|---|
| 2023/0297527 A1* | 9/2023 | Turlik | .................... | G06F 13/28 710/22 |
| 2023/0409225 A1* | 12/2023 | Markuze | ............... | G06F 3/0604 |
| 2024/0244001 A1* | 7/2024 | Upadhye | ............... | H04L 45/745 |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].
Podobas et al, A Survey on Coarse-Grained Reconfigurable Architectures From a Performance Perspective, IEEEAccess, vol. 2020. 3012084, Jul. 27, 2020, 25 pages.
Prabhakar et al., Plasticine: A Reconfigurable Architecture for Parallel Patterns, ISCA, Jun. 24-28, 2017, 14 pages.

* cited by examiner

DIRECT ACCESS TO EXTERNAL STORAGE FROM A RECONFIGURABLE PROCESSOR

RELATED APPLICATIONS AND DOCUMENTS

This application claims the benefit of U.S. Provisional Patent Application No. 63/308,904, entitled, "Storage Direct" filed on 10 Feb. 2022. The provisional application is hereby incorporated by reference for all purposes.

This application also is related to the following papers and commonly owned applications:

- Prabhakar et al., "Plasticine: A Reconfigurable Architecture for Parallel Patterns," ISCA '17, Jun. 24-28, 2017, Toronto, ON, Canada;
- Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;
- U.S. Nonprovisional patent application Ser. No. 16/239,252, now U.S. Pat. No. 10,698,853 B1, filed Jan. 3, 2019, entitled "VIRTUALIZATION OF A RECONFIGURABLE DATA PROCESSOR;"
- U.S. Nonprovisional patent application Ser. No. 16/862,445, now U.S. Pat. No. 11,188,497 B2, filed Apr. 29, 2020, entitled "VIRTUALIZATION OF A RECONFIGURABLE DATA PROCESSOR;"
- U.S. Nonprovisional patent application Ser. No. 16/197,826, now U.S. Pat. No. 10,831,507 B2, filed Nov. 21, 2018, entitled "CONFIGURATION LOAD OF A RECONFIGURABLE DATA PROCESSOR;"
- U.S. Nonprovisional patent application Ser. No. 16/198,086, now U.S. Pat. No. 11,188,497 B2, filed Nov. 21, 2018, entitled "CONFIGURATION UNLOAD OF A RECONFIGURABLE DATA PROCESSOR;"
- U.S. Nonprovisional patent application Ser. No. 17/093,543, filed Nov. 9, 2020, entitled "EFFICIENT CONFIGURATION OF A RECONFIGURABLE DATA PROCESSOR;"
- U.S. Nonprovisional patent application Ser. No. 16/260,548, now U.S. Pat. No. 10,768,899 B2, filed Jan. 29, 2019, entitled "MATRIX NORMAL/TRANSPOSE READ AND A RECONFIGURABLE DATA PROCESSOR INCLUDING SAME;"
- U.S. Nonprovisional patent application Ser. No. 16/536,192, now U.S. Pat. No. 11,080,227 B2, filed Aug. 8, 2019, entitled "COMPILER FLOW LOGIC FOR RECONFIGURABLE ARCHITECTURES;"
- U.S. Nonprovisional patent application Ser. No. 17/326,128, filed May 20, 2021, entitled "COMPILER FLOW LOGIC FOR RECONFIGURABLE ARCHITECTURES;"
- U.S. Nonprovisional patent application Ser. No. 16/407,675, now U.S. Pat. No. 11,386,038 B2, filed May 9, 2019, entitled "CONTROL FLOW BARRIER AND RECONFIGURABLE DATA PROCESSOR;"
- U.S. Nonprovisional patent application Ser. No. 16/504,627, now U.S. Pat. No. 11,055,141 B2, filed Jul. 8, 2019, entitled "QUIESCE RECONFIGURABLE DATA PROCESSOR;"
- U.S. Nonprovisional patent application Ser. No. 17/322,697, filed May 17, 2021, entitled "QUIESCE RECONFIGURABLE DATA PROCESSOR;"
- U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION;"
- U.S. Nonprovisional patent application Ser. No. 16/744,077, filed Jan. 15, 2020, entitled "COMPUTATIONALLY EFFICIENT SOFTMAX LOSS GRADIENT BACKPROPAGATION;"
- U.S. Nonprovisional patent application Ser. No. 16/590,058, now U.S. Pat. No. 11,327,713 B2, filed Oct. 1, 2019, entitled "COMPUTATION UNITS FOR FUNCTIONS BASED ON LOOKUP TABLES;"
- U.S. Nonprovisional patent application Ser. No. 16/695,138, now U.S. Pat. No. 11,328,038 B2, filed Nov. 25, 2019, entitled "COMPUTATIONAL UNITS FOR BATCH NORMALIZATION;"
- U.S. Nonprovisional patent application Ser. No. 16/688,069, filed Nov. 19, 2019, now U.S. Pat. No. 11,327,717 B2, entitled "LOOK-UP TABLE WITH INPUT OFFSETTING;"
- U.S. Nonprovisional patent application Ser. No. 16/718,094, filed Dec. 17, 2019, now U.S. Pat. No. 11,150,872 B2, entitled "COMPUTATIONAL UNITS FOR ELEMENT APPROXIMATION;"
- U.S. Nonprovisional patent application Ser. No. 16/560,057, now U.S. Pat. No. 11,327,923 B2, filed Sep. 4, 2019, entitled "SIGMOID FUNCTION IN HARDWARE AND A RECONFIGURABLE DATA PROCESSOR INCLUDING SAME;"
- U.S. Nonprovisional patent application Ser. No. 16/572,527, now U.S. Pat. No. 11,410,027 B2, filed Sep. 16, 2019, entitled "Performance Estimation-Based Resource Allocation for Reconfigurable Architectures;"
- U.S. Nonprovisional patent application Ser. No. 15/930,381, now U.S. Pat. No. 11,250,105 B2, filed May 12, 2020, entitled "COMPUTATIONALLY EFFICIENT GENERAL MATRIX-MATRIX MULTIPLICATION (GEMM);"
- U.S. Nonprovisional patent application Ser. No. 17/337,080, now U.S. Pat. No. 11,328,209 B1, filed Jun. 2, 2021, entitled "MEMORY EFFICIENT DROPOUT;"
- U.S. Nonprovisional patent application Ser. No. 17/337,126, now U.S. Pat. No. 11,256,987 B1, filed Jun. 2, 2021, entitled "MEMORY EFFICIENT DROPOUT, WITH REORDERING OF DROPOUT MASK ELEMENTS;"
- U.S. Nonprovisional patent application Ser. No. 16/890,841, filed Jun. 2, 2020, entitled "ANTI-CONGESTION FLOW CONTROL FOR RECONFIGURABLE PROCESSORS;"
- U.S. Nonprovisional patent application Ser. No. 17/023,015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS;"
- U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION;"
- U.S. Nonprovisional patent application Ser. No. 17/175,289, now U.S. Pat. No. 11,126,574 B1, filed Feb. 12, 2021, entitled "INSTRUMENTATION PROFILING FOR RECONFIGURABLE PROCESSORS;"
- U.S. Nonprovisional patent application Ser. No. 17/371,049, filed Jul. 8, 2021, entitled "SYSTEMS AND METHODS FOR EDITING TOPOLOGY OF A RECONFIGURABLE DATA PROCESSOR;"

U.S. Nonprovisional patent application Ser. No. 16/922, 975, filed Jul. 7, 2020, entitled "RUNTIME VIRTUALIZATION OF RECONFIGURABLE DATA FLOW RESOURCES;"

U.S. Nonprovisional patent application Ser. No. 16/996, 666, filed Aug. 18, 2020, entitled "RUNTIME PATCHING OF CONFIGURATION FILES;"

U.S. Nonprovisional patent application Ser. No. 17/214, 768, now U.S. Pat. No. 11,200,096 B1, filed Mar. 26, 2021, entitled "RESOURCE ALLOCATION FOR RECONFIGURABLE PROCESSORS;"

U.S. Nonprovisional patent application Ser. No. 17/127, 818, now U.S. Pat. No. 11,182,264 B1, filed Dec. 18, 2020, entitled "INTRA-NODE BUFFER-BASED STREAMING FOR RECONFIGURABLE PROCESSOR-AS-A-SERVICE (RPAAS);"

U.S. Nonprovisional patent application Ser. No. 17/127, 929, now U.S. Pat. No. 11,182,221 B1, filed Dec. 18, 2020, entitled "INTER-NODE BUFFER-BASED STREAMING FOR RECONFIGURABLE PROCESSOR-AS-A-SERVICE (RPAAS);"

U.S. Nonprovisional patent application Ser. No. 17/185, 264, filed Feb. 25, 2021, entitled "TIME-MULTIPLEXED USE OF RECONFIGURABLE HARDWARE;"

U.S. Nonprovisional patent application Ser. No. 17/216, 647, now U.S. Pat. No. 11,204,889 B1, filed Mar. 29, 2021, entitled "TENSOR PARTITIONING AND PARTITION ACCESS ORDER;"

U.S. Nonprovisional patent application Ser. No. 17/216, 650, now U.S. Pat. No. 11,366,783 B1, filed Mar. 29, 2021, entitled "MULTI-HEADED MULTI-BUFFER FOR BUFFERING DATA FOR PROCESSING;"

U.S. Nonprovisional patent application Ser. No. 17/216, 657, now U.S. Pat. No. 11,263,170 B1, filed Mar. 29, 2021, entitled "LOSSLESS TILING IN CONVOLUTION NETWORKS—PADDING BEFORE TILING, LOCATION-BASED TILING, AND ZEROING-OUT;"

U.S. Nonprovisional patent application Ser. No. 17/384, 515, filed Jul. 23, 2021, entitled "LOSSLESS TILING IN CONVOLUTION NETWORKS—MATERIALIZATION OF TENSORS;"

U.S. Nonprovisional patent application Ser. No. 17/216, 651, now U.S. Pat. No. 11,195,080 B1, filed Mar. 29, 2021, entitled "LOSSLESS TILING IN CONVOLUTION NETWORKS—TILING CONFIGURATION;"

U.S. Nonprovisional patent application Ser. No. 17/216, 652, now U.S. Pat. No. 11,227,207 B1, filed Mar. 29, 2021, entitled "LOSSLESS TILING IN CONVOLUTION NETWORKS—SECTION BOUNDARIES;"

U.S. Nonprovisional patent application Ser. No. 17/216, 654, now U.S. Pat. No. 11,250,061 B1, filed Mar. 29, 2021, entitled "LOSSLESS TILING IN CONVOLUTION NETWORKS—READ-MODIFY-WRITE IN BACKWARD PASS;"

U.S. Nonprovisional patent application Ser. No. 17/216, 655, now U.S. Pat. No. 11,232,360 B1, filed Mar. 29, 2021, entitled "LOSSLESS TILING IN CONVOLUTION NETWORKS—WEIGHT GRADIENT CALCULATION;"

U.S. Nonprovisional patent application Ser. No. 17/364, 110, filed Jun. 30, 2021, entitled "LOSSLESS TILING IN CONVOLUTION NETWORKS—TILING CONFIGURATION FOR A SEQUENCE OF SECTIONS OF A GRAPH;"

U.S. Nonprovisional patent application Ser. No. 17/364, 129, filed Jun. 30, 2021, entitled "LOSSLESS TILING IN CONVOLUTION NETWORKS—TILING CONFIGURATION BETWEEN TWO SECTIONS;"

"U.S. Nonprovisional patent application Ser. No. 17/364, 141, filed Jun. 30, 2021, entitled ""LOSSLESS TILING IN CONVOLUTION NETWORKS—PADDING AND RE-TILLING AT SECTION BOUNDARIES;"

U.S. Nonprovisional patent application Ser. No. 17/384, 507, filed Jul. 23, 2021, entitled "LOSSLESS TILING IN CONVOLUTION NETWORKS—BACKWARD PASS;"

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP;"

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT;"

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT;"

U.S. Provisional Patent Application No. 63/190,749, filed May 19, 2021, entitled "FLOATING POINT MULTIPLY-ADD, ACCUMULATE UNIT WITH CARRY-SAVE ACCUMULATOR;"

U.S. Provisional Patent Application No. 63/174,460, filed Apr. 13, 2021, entitled "EXCEPTION PROCESSING IN CARRY-SAVE ACCUMULATION UNIT FOR MACHINE LEARNING;"

U.S. Nonprovisional patent application Ser. No. 17/397, 241, now U.S. Pat. No. 11,429,349 B1, filed Aug. 9, 2021, entitled "FLOATING POINT MULTIPLY-ADD, ACCUMULATE UNIT WITH CARRY-SAVE ACCUMULATOR;"

U.S. Nonprovisional patent application Ser. No. 17/216, 509, now U.S. Pat. No. 11,191,182 B1, filed Mar. 29, 2021, entitled "UNIVERSAL RAIL KIT;"

U.S. Nonprovisional patent application Ser. No. 17/379, 921, now U.S. Pat. No. 11,392,740 B2, filed Jul. 19, 2021, entitled "DATAFLOW FUNCTION OFFLOAD TO RECONFIGURABLE PROCESSORS;"

U.S. Nonprovisional patent application Ser. No. 17/379, 924, now U.S. Pat. No. 11,237,880 B1, filed Jul. 19, 2021, entitled "DATAFLOW ALL-REDUCE FOR RECONFIGURABLE PROCESSOR SYSTEMS;"

U.S. Nonprovisional patent application Ser. No. 17/378, 342, now U.S. Pat. No. 11,556,494 B1, filed Jul. 16, 2021, entitled "DEFECT REPAIR FOR A RECONFIGURABLE DATA PROCESSOR;"

U.S. Nonprovisional patent application Ser. No. 17/378, 391, now U.S. Pat. No. 11,327,771 B1, filed Jul. 16, 2021, entitled "DEFECT REPAIR CIRCUITS FOR A RECONFIGURABLE DATA PROCESSOR;"

U.S. Nonprovisional patent application Ser. No. 17/378, 399, now U.S. Pat. No. 11,409,540 B1, filed Jul. 16, 2021, entitled "ROUTING CIRCUITS FOR DEFECT REPAIR FOR A RECONFIGURABLE DATA PROCESSOR;"

U.S. Provisional Patent Application No. 63/220,266, filed Jul. 9, 2021, entitled "LOGIC BIST AND FUNCTIONAL TEST FOR A CGRA;"

U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM;"

U.S. Nonprovisional patent application Ser. No. 17/338,620, now U.S. Pat. No. 11,323,124 B1, filed Jun. 3, 2021, entitled "VARIABLE-LENGTH CLOCK STRETCHER WITH CORRECTION FOR GLITCHES DUE TO FINITE DLL BANDWIDTH;"

U.S. Nonprovisional patent application Ser. No. 17/338,625, now U.S. Pat. No. 11,239,846 B1, filed Jun. 3, 2021, entitled "VARIABLE-LENGTH CLOCK STRETCHER WITH CORRECTION FOR GLITCHES DUE TO PHASE DETECTOR OFFSET;"

U.S. Nonprovisional patent application Ser. No. 17/338,626, now U.S. Pat. No. 11,290,113 B1, filed Jun. 3, 2021, entitled "VARIABLE-LENGTH CLOCK STRETCHER WITH CORRECTION FOR DIGITAL DLL GLITCHES;"

U.S. Nonprovisional patent application Ser. No. 17/338,629, now U.S. Pat. No. 11,290,114 B1, filed Jun. 3, 2021, entitled "VARIABLE-LENGTH CLOCK STRETCHER WITH PASSIVE MODE JITTER REDUCTION;"

U.S. Nonprovisional patent application Ser. No. 17/405,913, now U.S. Pat. No. 11,334,109 B1, filed Aug. 18, 2021, entitled "VARIABLE-LENGTH CLOCK STRETCHER WITH COMBINER TIMING LOGIC;"

U.S. Provisional Patent Application No. 63/230,782, filed Aug. 8, 2021, entitled "LOW-LATENCY MASTER-SLAVE CLOCKED STORAGE ELEMENT;"

U.S. Provisional Patent Application No. 63/236,218, filed Aug. 23, 2021, entitled "SWITCH FOR A RECONFIGURABLE DATAFLOW PROCESSOR;"

U.S. Provisional Patent Application No. 63/236,214, filed Aug. 23, 2021, entitled "SPARSE MATRIX MULTIPLIER;"

U.S. Provisional Patent Application No. 63/389,767, filed Jul. 15, 2022. entitled "PEER-TO-PEER COMMUNICATION BETWEEN RECONFIGURABLE DATAFLOW UNITS;"

U.S. Provisional Patent Application No. 63/405,240, filed Sep. 9, 2022, entitled "PEER-TO-PEER ROUTE THROUGH IN A RECONFIGURABLE COMPUTING SYSTEM."

All of the related application(s) and documents listed above are hereby incorporated by reference herein for all purposes.

FIELD OF THE TECHNOLOGY DISCLOSED

The present technology relates to a data processing system, and more particularly, to a data processing system with local busses, a host processor, a network interface controller (NIC), one or more reconfigurable processors, and a bus switch that couples the multiple local busses, thereby operatively coupling the one or more reconfigurable processors, the host processor, and the NIC. The one or more reconfigurable processors are configured to implement a virtual function that uses a virtual address for a memory access operation. The host processor is configured to implement an application programming interface (API) that translates the virtual address into a physical address, and the NIC uses the physical address to initiate a direct data access operation at the external storage that moves data directly between the one or more reconfigurable processors and the external storage.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including FPGAs, can be configured to implement a variety of functions more efficiently or faster than might be achieved using a general-purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of low-latency and energy-efficient accelerators for machine learning and artificial intelligence workloads.

Such reconfigurable processors, and especially CGRAs, often include specialized hardware elements such as computing resources and device memory that operate in conjunction with one or more software elements such as a CPU and attached host memory to train a neural network and/or to make inference with a neural network.

Training a neural network involves determining weights that are associated with the neural network, and making inference involves using a trained neural network to compute results by processing input data based on weights associated with the trained neural network. During the training of a neural network, data including the parameters of the training model is written to the device memory and/or read from the device memory.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
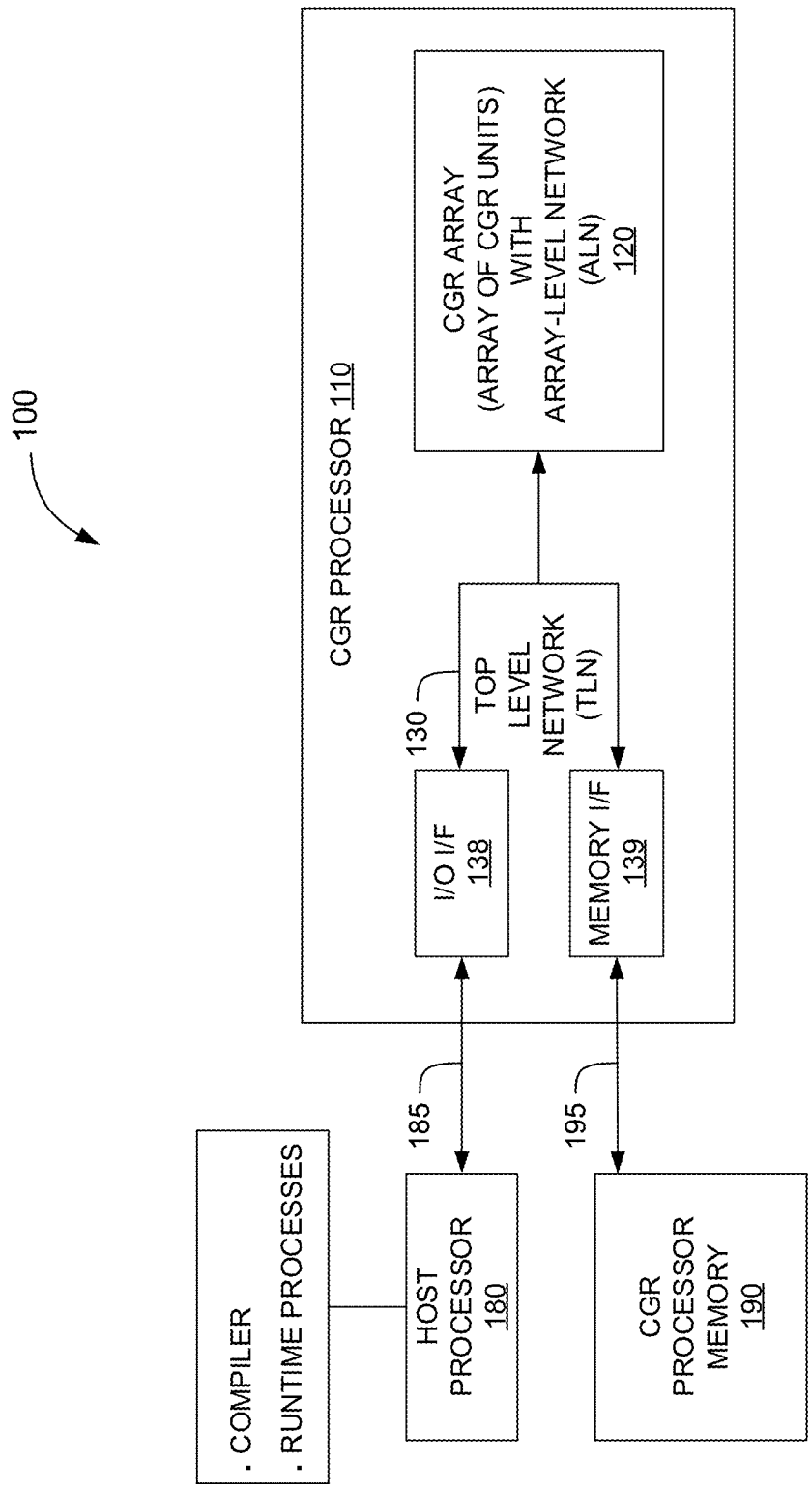
FIG. 1 is a diagram of an illustrative data processing system including a coarse-grained reconfigurable (CGR) processor, CGR processor memory, and a host processor.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are adapted for parallel processing, such as coarse-grained reconfigurable architectures (CGRAs) or graphic processing units (GPUs).

Reconfigurable processors, and especially CGRAs, often include specialized hardware elements such as computing and memory units that operate in conjunction with one or more software elements such as a host processor and attached host memory to train a neural network for a machine learning or artificial intelligence application and/or to make inference with the neural network. During the training of a neural network, data including the parameters of the training model is written to the memory units or to an attached reconfigurable processor memory and/or read from the memory units or from the attached reconfigurable processor memory.

The introduction of checkpoints in neural network training for the purpose of re-creating the model, the weights of the model, the training configuration, and the state of the optimizer, involves saving the current state of the training model. Thus, the contents of the memory units and/or the contents of the attached reconfigurable processor memory are retrieved and saved in external storage.

Traditionally, the saving of the data from the memory units and/or from the attached reconfigurable processor memory (i.e., from the reconfigurable processor) occurs in two operations. In a first operation, the data is moved from the memory units or the attached reconfigurable processor memory (i.e., from the reconfigurable processor) to the host memory, and, in a second operation, the data is moved from the host memory to the external storage. Similarly, restoring the data to the memory units or the attached reconfigurable processor memory (i.e., to the reconfigurable processor) occurs in two operations. In a first operation, the data is moved from the external storage to the host memory, and, in a second operation, the data is moved from the host memory to the memory units or the attached reconfigurable processor memory (i.e., to the reconfigurable processor).

It is desirable therefore to provide a new approach of directly moving the data between the reconfigurable processor and the external storage. The new approach bypasses the host processor and the host memory. The new approach provides for low latency and higher bandwidth requirements and result in less host processor resource utilization.

A data processing system is described which provides direct access to external storage. The data processing system is well-suited for applications like machine-learning (ML) and training of neural networks and includes one or more reconfigurable processors. If desired, the one or more reconfigurable processors include arrays of coarse-grained reconfigurable (CGR) units, which are sometimes also referred to as CGR arrays.

The architecture, configurability, and data flow capabilities of an array of coarse-grained reconfigurable (CGR) units enable increased compute power that supports both parallel and pipelined computation. A CGR processor, which includes one or more CGR arrays (arrays of CGR units), can be programmed to simultaneously execute multiple independent and interdependent data flow graphs. To enable simultaneous execution, the data flow graphs may be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or data flow graphs). This requirement implies that a compiler for a CGRA must decide which operation of a computation graph or data flow graph is assigned to which of the CGR units, and how both data and, related to the support of data flow graphs, control information flows among CGR units, and to and from host processor(s) and attached CGR processor memory.

FIG. 1 illustrates an example data processing system 100 including a CGR processor 110, a host processor 180, and an attached CGR processor memory 190. As shown, CGR processor 110 has a coarse-grained reconfigurable architecture (CGRA) and includes an array of CGR units 120 such as a CGR array. CGR processor 110 may include an input-output (I/O) interface 138 and a memory interface 139. Array of CGR units 120 may be coupled with (I/O) interface 138 and memory interface 139 via databus 130 which may be part of a top-level network (TLN). Host processor 180 communicates with I/O interface 138 via system databus 185, which may be a local bus as described hereinafter, and memory interface 139 communicates with attached CGR processor memory 190 via memory bus 195.

Array of CGR units 120 may further include compute units and memory units that are interconnected with an array-level network (ALN) to provide the circuitry for execution of a computation graph or a data flow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, data flow graphs, models, deep learning applications, deep learning neural networks, programs, program images, jobs, tasks and/or any other procedures and functions that may perform serial and/or parallel processing.

In some implementations, execution of the graph(s) may involve using more than one CGR processor 110. In some implementations, CGR processor 110 may include one or more arrays of CGR units 120.

Host processor 180 may be, or include, a computer such as further described with reference to FIG. 2. Host processor 180 runs runtime processes, as further referenced herein. Therefore, host processor 180 or portions of host processor 180 are sometimes also referred to as a runtime processor. In some implementations, host processor 180 may also be used to run computer programs, such as the compiler further described herein with reference to FIG. 6. In some implementations, the compiler may run on a computer that is similar to the computer described with reference to FIG. 2, but separate from host processor 180.

CGR processor 110 may accomplish computational tasks by executing a configuration file (e.g., a processor-executable format (PEF) file). For the purposes of this description, a configuration file corresponds to a data flow graph, or a translation of a data flow graph, and may further include initialization data. A compiler compiles the high-level program to provide the configuration file. In some implementations described herein, a CGR array 120 is configured by programming one or more configuration stores with all or parts of the configuration file. Therefore, the configuration file is sometimes also referred to as a programming file.

A single configuration store may be at the level of the CGR processor 110 or the CGR array 120, or a CGR unit may include an individual configuration store. The configuration file may include configuration data for the CGR array and CGR units in the CGR array, and link the computation graph to the CGR array. Execution of the configuration file by CGR processor 110 causes the CGR array (s) to implement the user algorithms and functions in the data flow graph.

CGR processor 110 can be implemented on a single integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
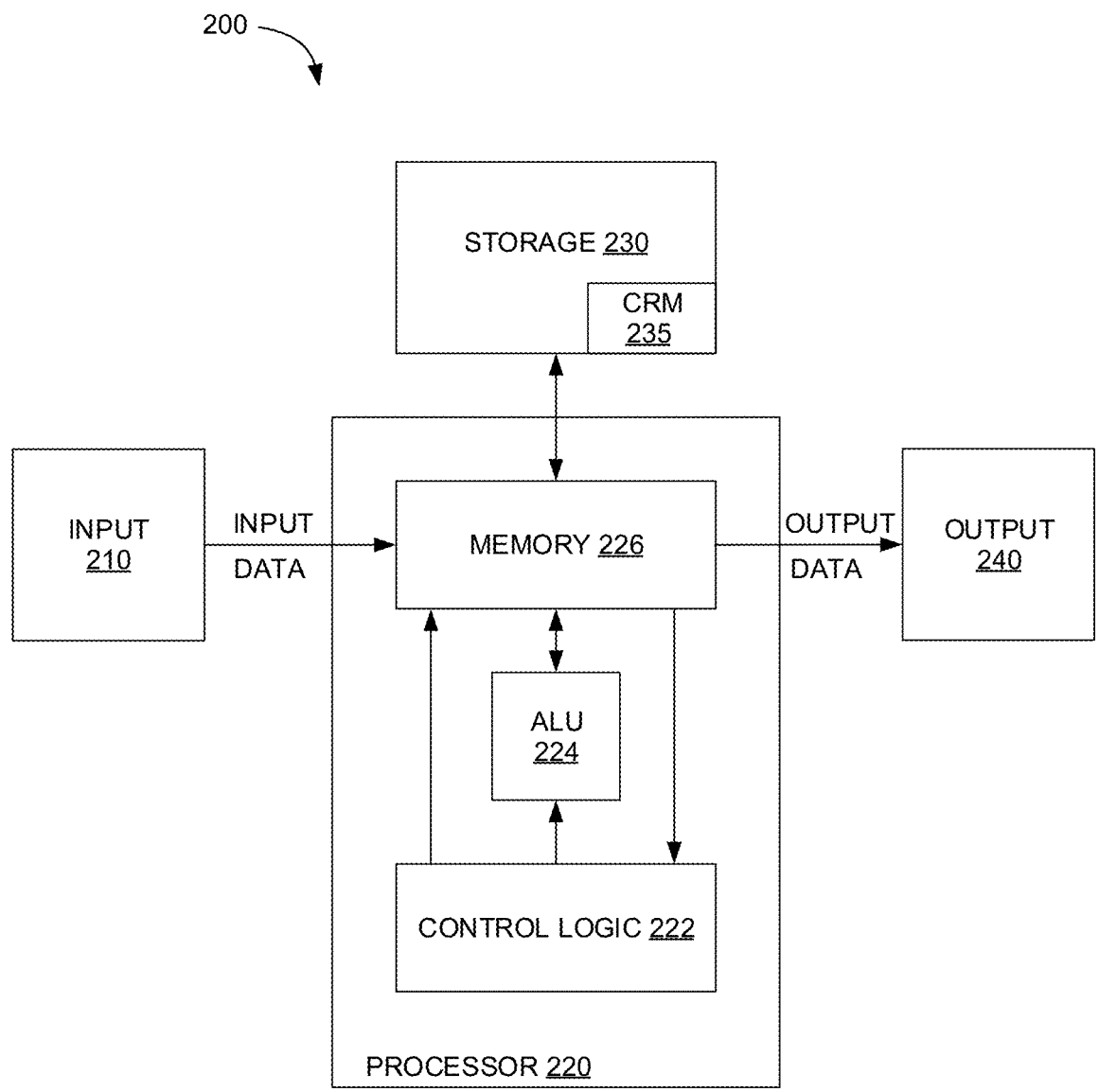
FIG. 2 is a diagram of an illustrative computer, including an input device, a processor, a storage device, and an output device.

FIG. 2 illustrates an example of a computer 200, including an input device 210, a processor 220, a storage device 230, and an output device 240. Although the example computer 200 is drawn with a single processor 220, other implementations may have multiple processors. Input device 210 may comprise a mouse, a keyboard, a sensor, an input port (e.g., a universal serial bus (USB) port), and/or any other input device known in the art. Output device 240 may comprise a monitor, printer, and/or any other output device known in the art. Illustratively, part or all of input device 210 and output device 240 may be combined in a network interface, such as a Peripheral Component Interconnect Express (PCIe) interface suitable for communicating with CGR processor 110 of FIG. 1.

Input device 210 is coupled with processor 220, which is sometimes also referred to as host processor 220) to provide input data. If desired, memory 226 of processor 220 may store the input data. Processor 220 is coupled with output device 240. In some implementations, memory 226 may provide output data to output device 240.

Processor 220 further includes control logic 222 and arithmetic and logic unit (ALU) 224. Control logic 222 may be operable to control memory 226 and ALU 224. If desired, control logic 222 may be operable to receive program and configuration data from memory 226. Illustratively, control logic 222 may control exchange of data between memory 226 and storage device 230. Memory 226 may comprise memory with fast access, such as static random-access memory (SRAM). Storage device 230 may comprise memory with slow access, such as dynamic random-access memory (DRAM), flash memory, magnetic disks, optical disks, and/or any other memory type known in the art. At least a part of the memory in storage device 230 includes a non-transitory computer-readable medium (CRM 235), such as used for storing computer programs. The storage device 230 is sometimes also referred to as host memory.

Figure 3:
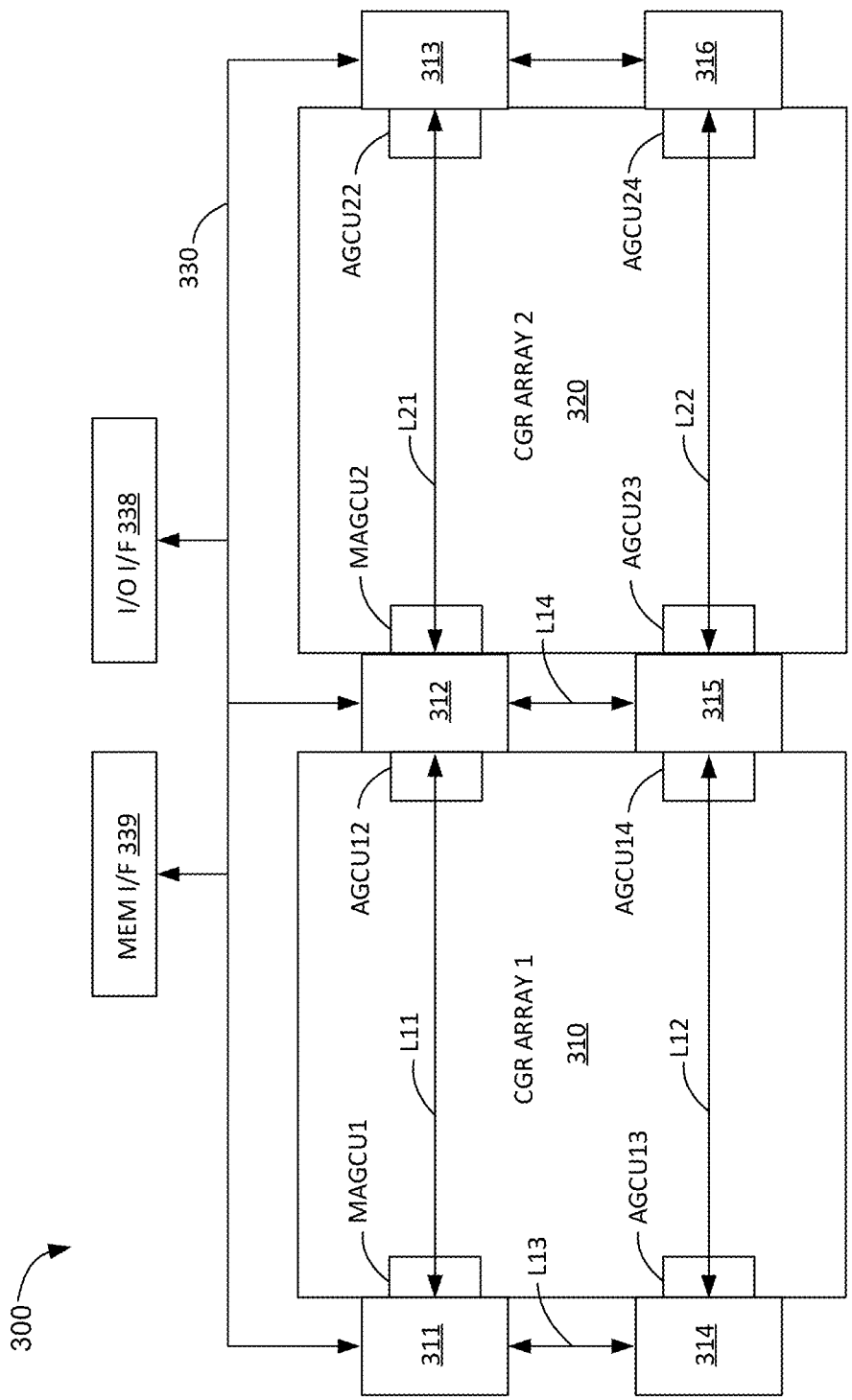
FIG. 3 is a diagram of an illustrative reconfigurable processor including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., pattern memory units (PMUs), pattern compute units (PCUs), fused-control memory units (FCMUs)) coupled via an array-level network (ALN), e.g., a bus system. The ALN may be coupled with the TLN 330 through several Address Generation and Coalescing Units (AGCUs), and consequently with input/output (I/O) interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN 330 and external devices, such as high-capacity memory, host processors, other CGR processors, FPGA devices, and so on, that may be coupled with the interfaces.

As shown in FIG. 3, each CGR array 310, 320 has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN 330 may be constructed using top-level switches (e.g., switch 311, switch 312, switch 313, switch 314, switch 315, and switch 316). If desired, the top-level switches may be coupled with at least one other top-level switch. At least some top-level switches may be connected with other circuits on the TLN, including the AGCUs, and external I/O interface 338.

Illustratively, the TLN 330 includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
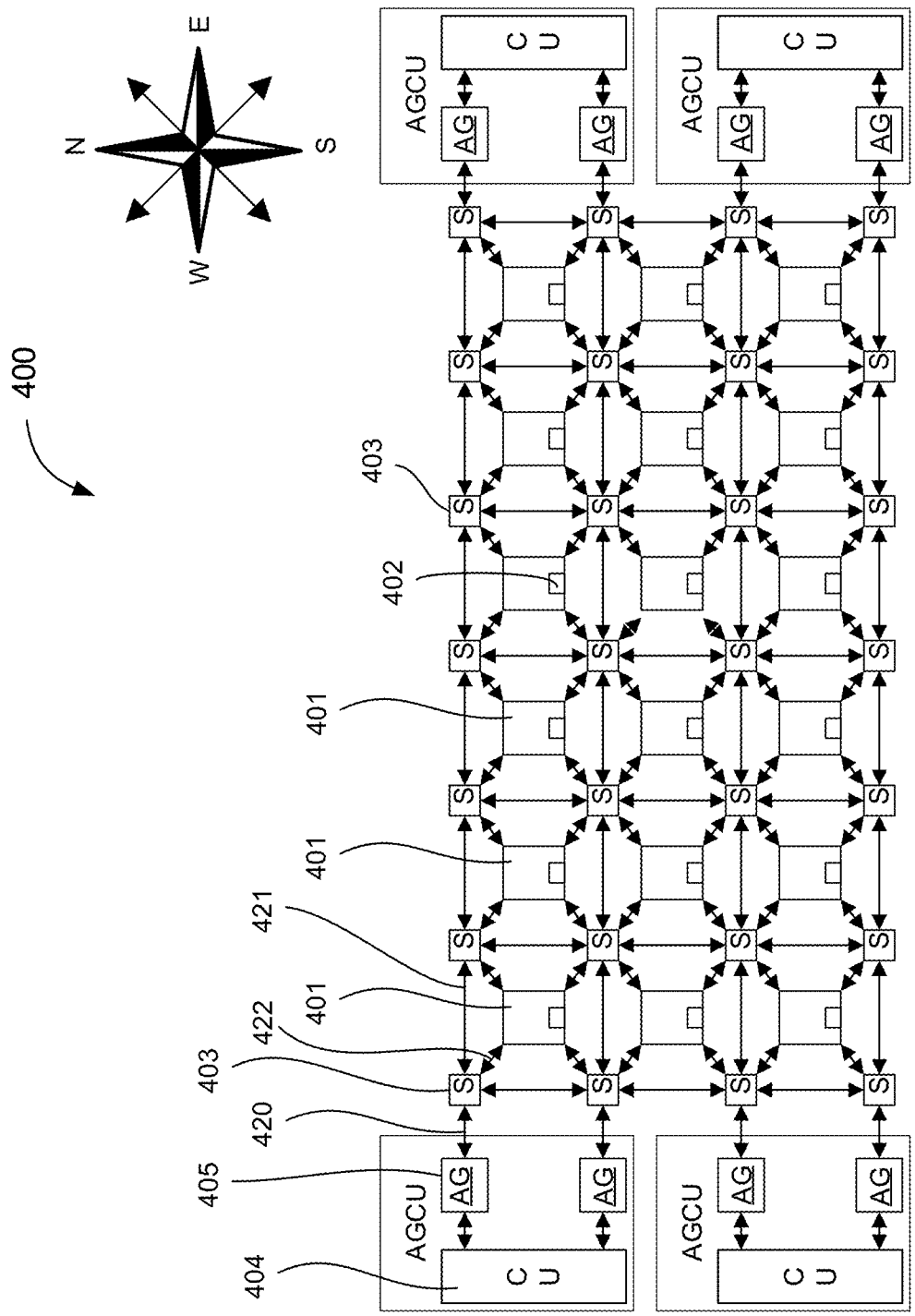
FIG. 4 is a diagram of an illustrative CGR array including CGR units and an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada.

Illustratively, each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns.

The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections.

A configuration file may include configuration data representing an initial configuration, or starting state, of each of the CGR units 401 that execute a high-level program with user algorithms and functions. Program load is the process of setting up the configuration stores 402 in the CGR array 400 based on the configuration data to allow the CGR units 401 to execute the high-level program. Program load may also require loading memory units and/or PMUs.

In some implementations, a runtime processor (e.g., the portions of host processor 180 of FIG. 1 that execute runtime processes) may perform the program load.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403, as shown in the example of FIG. 4, may have eight interfaces. The North, South, East and West interfaces of a switch unit may be used for links between switch units 403 using interconnects 421. The Northeast, Southeast, Northwest and Southwest interfaces of a switch unit 403 may each be used to make a link with an FCMU, PCU or PMU instance 401 using one of the interconnects 422. Two switch units 403 in each CGR array quadrant have links to an AGCU using interconnects 420. The coalescing unit 404 of the AGCU arbitrates between the AGs 405 and processes memory requests. Each of the eight interfaces of a switch unit 403 can include a vector interface, a scalar interface, and a control interface to communicate with the vector network, the scalar network, and the control network. In other implementations, a switch unit 403 may have any number of interfaces.

During execution of a graph or subgraph in a CGR array 400 after configuration, data can be sent via one or more switch units 403 and one or more links 421 between the switch units to the CGR units 401 using the vector bus and vector interface(s) of the one or more switch units 403 on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
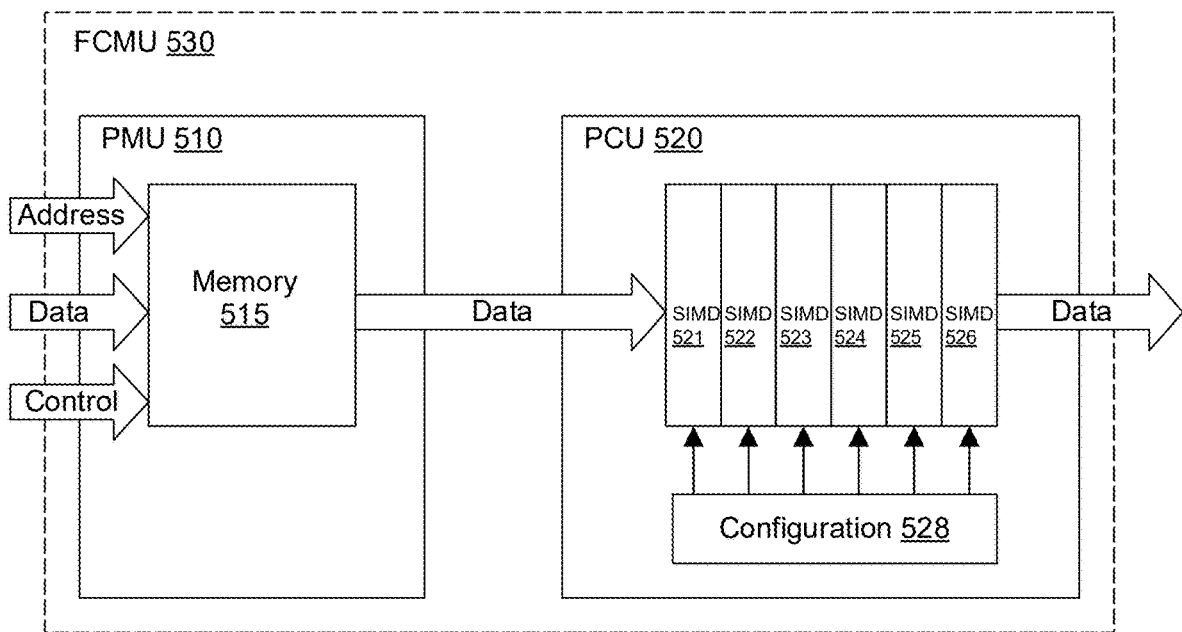
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (e.g., write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
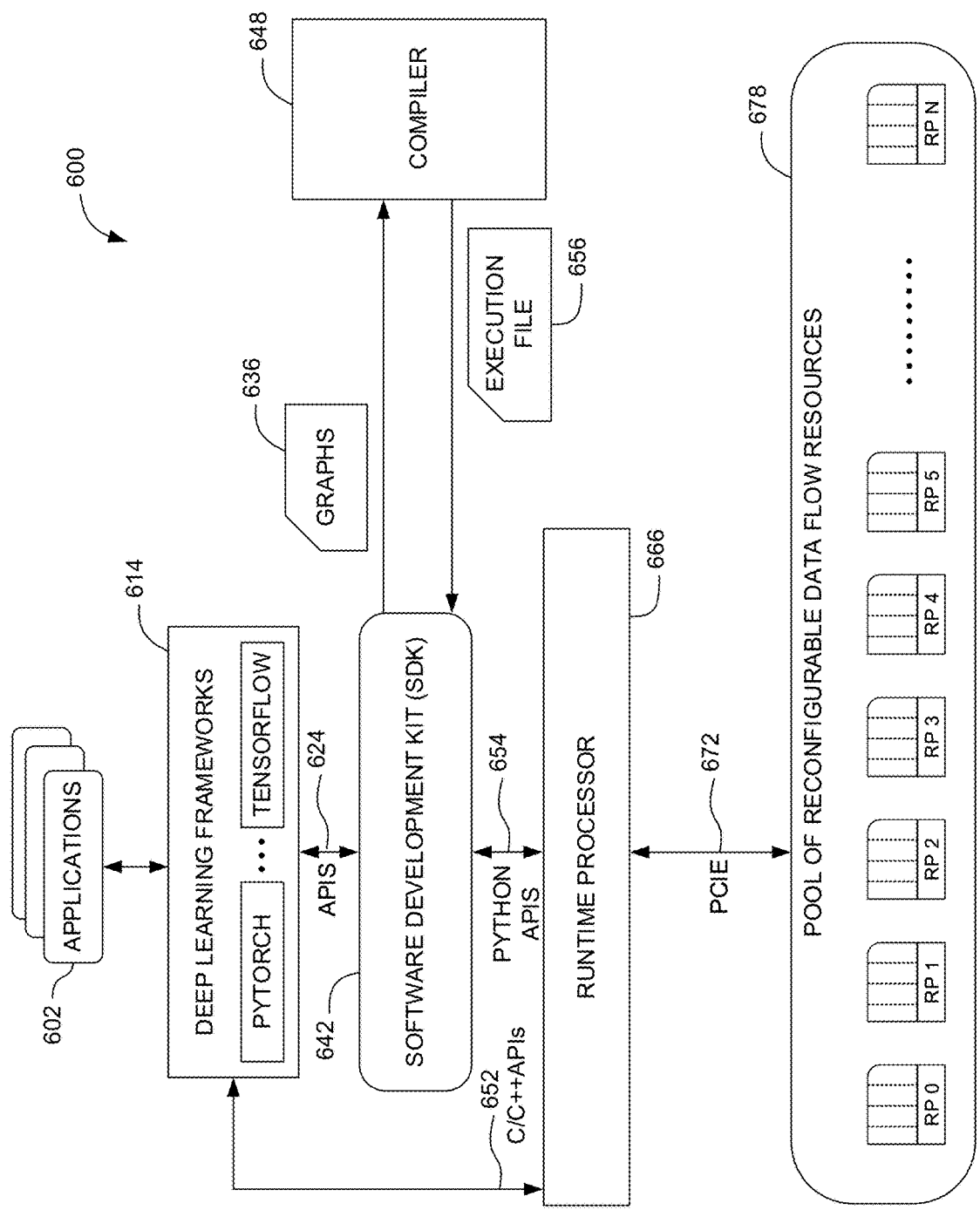
FIG. 6 is a diagram of an illustrative compute environment in which applications are provided a unified interface to a pool of reconfigurable data flow resources such that the pool of reconfigurable data flow resources is available to the applications as a single reconfigurable processor.

FIG. 6 shows a compute environment 600 that provides on-demand network access to a pool of reconfigurable data flow resources 678 that can be rapidly provisioned and released with minimal management effort or service provider interaction. The pool of reconfigurable data flow resources 678 includes CGR processor memory (e.g., attached CGR processor memory 190 of FIG. 1), arrays of CGR units, and busses (e.g., memory bus 195 of FIG. 1 and/or TLN 330 of FIG. 3) that couple the arrays of CGR units and the CGR processor memory.

The busses or transfer resources enable the arrays of CGR units to receive and send data. Examples of the busses include peripheral component interface express (PCIe) channels, direct memory access (DMA) channels, double data-rate (DDR) channels, Ethernet channels, and InfiniBand channels. In some implementations, the busses include at least one of a DMA channel, a DDR channel, a PCIe channel, an Ethernet channel, or an InfiniBand channel.

The arrays of CGR units (e.g., arrays of compute units and memory units) are arranged in one or more reconfigurable processors (e.g., CGR processor 110 of FIG. 1) and may be coupled with each other in a programmable interconnect fabric (e.g., ALN 120 of FIG. 1). In some implementations, the arrays of CGR units are aggregated as a uniform pool of resources that are assigned to the execution of user applications.

The CGR processor memory of the pool of reconfigurable data flow resources 678 may be usable by the arrays of CGR units to store data. Examples of the CGR processor memory include main memory (e.g., off-chip/external dynamic random-access memory (DRAM)) and/or local secondary storage (e.g., local disks (e.g., hard disk drive (HDD), solid-state drive (SSD))). The memory units of the arrays of CGR units may include PMUs, latches, registers, and/or caches (e.g., SRAM). In some implementations, the pool of reconfigurable data flow resources 678 may be coupled to external storage, which may be located remotely, if desired. The external storage may include main memory (e.g., off-chip/external dynamic random-access memory (DRAM)), local secondary storage (e.g., local disks (e.g., hard disk drive (HDD), solid-state drive (SSD))), or remote secondary storage (e.g., distributed file systems, web servers).

The pool of reconfigurable data flow resources 678 is dynamically scalable to meet the performance objectives of applications 602 (or user applications 602). In some implementations, the applications 602 access the pool of reconfigurable data flow resources 678 over one or more networks (e.g., Internet).

The pool of reconfigurable data flow resources 678 may have different compute scales and hierarchies according to different implementations of the technology disclosed.

In one example, the pool of reconfigurable data flow resources 678 is a node (or a single machine) with arrays of CGR units that are arranged in a plurality of reconfigurable processors, supported by bus and CGR processor memory. The node also includes a host processor (e.g., CPU) that exchanges data with the plurality of reconfigurable processors, for example, over a PCIe interface. The host processor includes a runtime processor that manages resource allocation, memory mapping, and execution of the configuration files for applications requesting execution from the host processor.

In another example, the pool of reconfigurable data flow resources 678 is a rack (or cluster) of nodes, such that each node in the rack runs a respective plurality of reconfigurable processors, and includes a respective host processor configured with a respective runtime processor. The runtime processors are distributed across the nodes and communicate with each other so that they have unified access to the reconfigurable processors attached not just to their own node on which they run, but also to the reconfigurable processors attached to every other node in the data center.

The nodes in the rack are connected, for example, over Ethernet or InfiniBand (IB). In yet another example, the pool of reconfigurable data flow resources 678 is a pod that comprises a plurality of racks. In yet another example, the pool of reconfigurable data flow resources 678 is a superpod that comprises a plurality of pods. In yet another example, the pool of reconfigurable data flow resources 678 is a zone that comprises a plurality of superpods. In yet another example, the pool of reconfigurable data flow resources 678 is a data center that comprises a plurality of zones.

Users may execute applications 602 on the compute environment 600. Therefore, applications 602 are sometimes also referred to as user applications. The applications 602 are executed on the pool of reconfigurable data flow resources 678 in a distributed fashion by programming the individual compute and memory components to asynchronously receive, process, and send data and control information.

In the pool of reconfigurable data flow resources 678, computation can be executed as deep, nested data flow pipelines that exploit nested parallelism and data locality very efficiently. These data flow pipelines contain several stages of computation, where each stage reads data from one or more input buffers with an irregular memory access pattern, performs computations on the data while using one or more internal buffers or scratchpad memory to store and retrieve intermediate results, and produce outputs that are written to one or more output buffers. The structure of these pipelines depends on the control and data flow graph representing the application. Pipelines can be arbitrarily nested and looped within each other.

The applications 602 comprise high-level programs. A high-level program may include source code written in programming languages like C, C++, Java, JavaScript, Python, and/or Spatial, for example, using deep learning frameworks 614 such as PyTorch, TensorFlow, ONNX, Caffe, and/or Keras. The high-level program can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and/or Transformer-XL.

Software development kit (SDK) 642 generates computation graphs (e.g., data flow graphs, control graphs) 636 of the high-level programs of the applications 602. The SDK 642 transforms the input behavioral description of the high-level programs into an intermediate representation such as the computation graphs 636. This may include code optimization steps like false data dependency elimination, dead-code elimination, and constant folding. The computation graphs 636 encode the data and control dependencies of the high-level programs.

The computation graphs 636 comprise nodes and edges. The nodes can represent compute operations and memory allocations. The edges can represent data flow and flow control. In some implementations, each loop in the high-level programs can be represented as a "controller" in the computation graphs 636. The computation graphs 636 support branches, loops, function calls, and other variations of control dependencies. In some implementations, after the computation graphs 636 are generated, additional analyses or optimizations focused on loop transformations can be performed, such as loop unrolling, loop pipelining, loop fission/fusion, and loop tiling.

The SDK 642 also supports programming the reconfigurable data flow resources in the pool of reconfigurable data flow resources 678 at multiple levels, for example, from the high-level deep learning frameworks 614 to C++ and assembly language. In some implementations, the SDK 642 allows programmers to develop code that runs directly on the reconfigurable data flow resources. In other implementations, the SDK 642 provides libraries that contain predefined functions like linear algebra operations, element-wise tensor operations, non-linearities, and reductions that are used for creating, executing, and profiling the computation graphs 636 on the reconfigurable data flow resources. The SDK 642 communicates with the deep learning frameworks 614 via Application Programming Interfaces (APIs) 624.

A compiler 648 transforms the computation graphs 636 into a hardware-specific configuration, which is specified in an execution file 656 generated by the compiler 648. In one implementation, the compiler 648 partitions the computation graphs 636 into memory allocations and execution fragments, and these partitions are specified in the execution file 656. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as intended by the program. Different ones of the execution fragments can contain different amounts of computation. Execution fragments can represent parallel patterns or portions of parallel patterns and are executable asynchronously.

In some implementations, the partitioning of the computation graphs 636 into the execution fragments includes treating calculations within at least one innermost loop of a nested loop of the computation graphs 636 as a separate execution fragment. In other implementations, the partitioning of the computation graphs 636 into the execution fragments includes treating calculations of an outer loop around the innermost loop of the computation graphs 636 as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data used to implement the computation graphs 636, and these memory allocations are specified in the execution file 656. Memory allocations define the type and the number of hardware resources (functional units, storage, or connectivity components). Main memory (e.g., DRAM) is memory outside the reconfigurable processors for which the memory allocations can be made. Scratchpad memory (e.g., SRAM) is memory inside the reconfigurable processors for which the memory allocations can be made. Other memory types for which the memory allocations can be made for various access patterns and layouts include read-only lookup-tables (LUTs), fixed size queues (e.g., FIFOs), and register files.

The compiler 648 binds memory allocations to virtual memory units and binds execution fragments to virtual compute units, and these bindings are specified in the execution file 656. In some implementations, the compiler 648 partitions execution fragments into memory fragments and compute fragments, and these partitions are specified in the execution file 656.

The compiler 648 assigns the memory fragments to the virtual memory units and assigns the compute fragments to the virtual compute units, and these assignments are specified in the execution file 656. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler 648 allocates the virtual memory units to physical memory units of a reconfigurable processor (e.g., pattern memory units (PMUs) of the reconfigurable processor) and allocates the virtual compute units to physical compute units of the reconfigurable processor (e.g., pattern compute units (PCUs) of the reconfigurable processor), and these allocations are specified in the execution file 656. The compiler 648 places the physical memory units and the physical compute units onto positions in the arrays of CGR units of the pool of reconfigurable data flow resources and routes data and control networks between the placed positions, and these placements and routes are specified in the execution file 656.

The compiler 648 may translate the applications 602 developed with commonly used open-source packages such as Keras and/or PyTorch into reconfigurable processor specifications. The compiler 648 generates the configuration files with configuration data for the placed positions and the routed data and control networks. In one implementation, this includes assigning coordinates and communication resources of the physical memory and compute units by placing and routing units onto the arrays of the CGR units while maximizing bandwidth and minimizing latency.

A runtime processor 666 receives the execution file 656 from the SDK 642 and uses the execution file 656 for resource allocation, memory mapping, and execution of the configuration files for the applications 602 on the pool of reconfigurable data flow resources 678. The runtime processor 666 may communicate with the SDK 642 over APIs 654 (e.g., Python APIs). If desired, the runtime processor 666 can directly communicate with the deep learning frameworks 614 over APIs 652 (e.g., C/C++ APIs).

The runtime processor 666 may be operatively coupled to the pool of reconfigurable data flow resources 678 via a local bus 672. If desired, the local bus 672 may be a PCIe bus or any other local bus that enables the runtime processor 666 to exchange data with the pool of reconfigurable data flow resources 678.

The runtime processor 666 parses the execution file 656, which includes a plurality of configuration files. Configuration files in the plurality of configurations files include configurations of the virtual data flow resources that are used to execute the user applications 602. The runtime processor 666 allocates a subset of the arrays of CGR units in the pool of reconfigurable data flow resources 678 to the virtual data flow resources.

The runtime processor 666 then loads the configuration files for the applications 602 to the subset of the arrays of CGR units. In the scenario in which the execution file 656 includes two user applications 602 (e.g., a first and a second user application), the runtime processor 666 is configured to load a first configuration file for executing the first user application to a first subset of the arrays of CGR units in the pool of reconfigurable data flow resources 678, and to load a second configuration file for executing the second user application to a second subset of the arrays of CGR units in the pool of reconfigurable data flow resources 678. In some implementations, the CGR processor memory and the arrays of CGR units of the one or more reconfigurable processors in the pool of reconfigurable data flow resources 678 are aggregated as a uniform pool of resources that are assigned to the execution of the first and second user applications 602. The runtime processor 666 then starts execution of the user applications 602 on the subsets of the arrays of CGR units.

An application for the purposes of this description includes the configuration files for reconfigurable data flow resources in the pool of reconfigurable data flow resources 678 compiled to execute a mission function procedure or set of procedures such as inferencing or learning in an artificial intelligence or machine learning system. A virtual machine for the purposes of this description comprises a set of reconfigurable data flow resources (including arrays of CGR units in one or more reconfigurable processor, bus, and CGR processor memory) configured to support execution of an application in arrays of CGR units and associated bus and CGR processor memory in a manner that appears to the application as if there were a physical constraint on the resources available, such as would be experienced in a physical machine. The virtual machine can be established as a part of the application of the mission function that uses the virtual machine, or it can be established using a separate configuration mechanism. In implementations described herein, virtual machines are implemented using resources of the pool of reconfigurable data flow resources 678 that are also used in the application, and so the configuration files for the application include the configuration data for its corresponding virtual machine, and links the application to a particular set of CGR units in the arrays of CGR units and associated bus and CGR processor memory.

The runtime processor 666 implements an application in a virtual machine that is allocated a particular set of reconfigurable data flow resources. The virtual machine includes a particular set of CGR units, which can include some or all CGR units of a single reconfigurable processor or of multiple reconfigurable processors, along with associated bus and CGR processor memory (e.g., PCIe channels, DMA channels, DDR channels, DRAM memory).

The runtime processor 666 respects the topology information (e.g., topology information 704 of FIG. 7) in the execution file 656 when allocating CGR units to the virtual data flow resources requested in the execution file 656. For example, consider the scenario in which the reconfigurable processor has a non-uniform communication bandwidth in East/West directions versus North/South directions. In this scenario, a virtual tile geometry that requires, for example, two tiles arranged horizontally, may suffer in performance if mapped to a physical tile geometry in which two tiles are arranged vertically. In some implementations, the topology information may specify rectilinear tile geometries.

Figure 7:
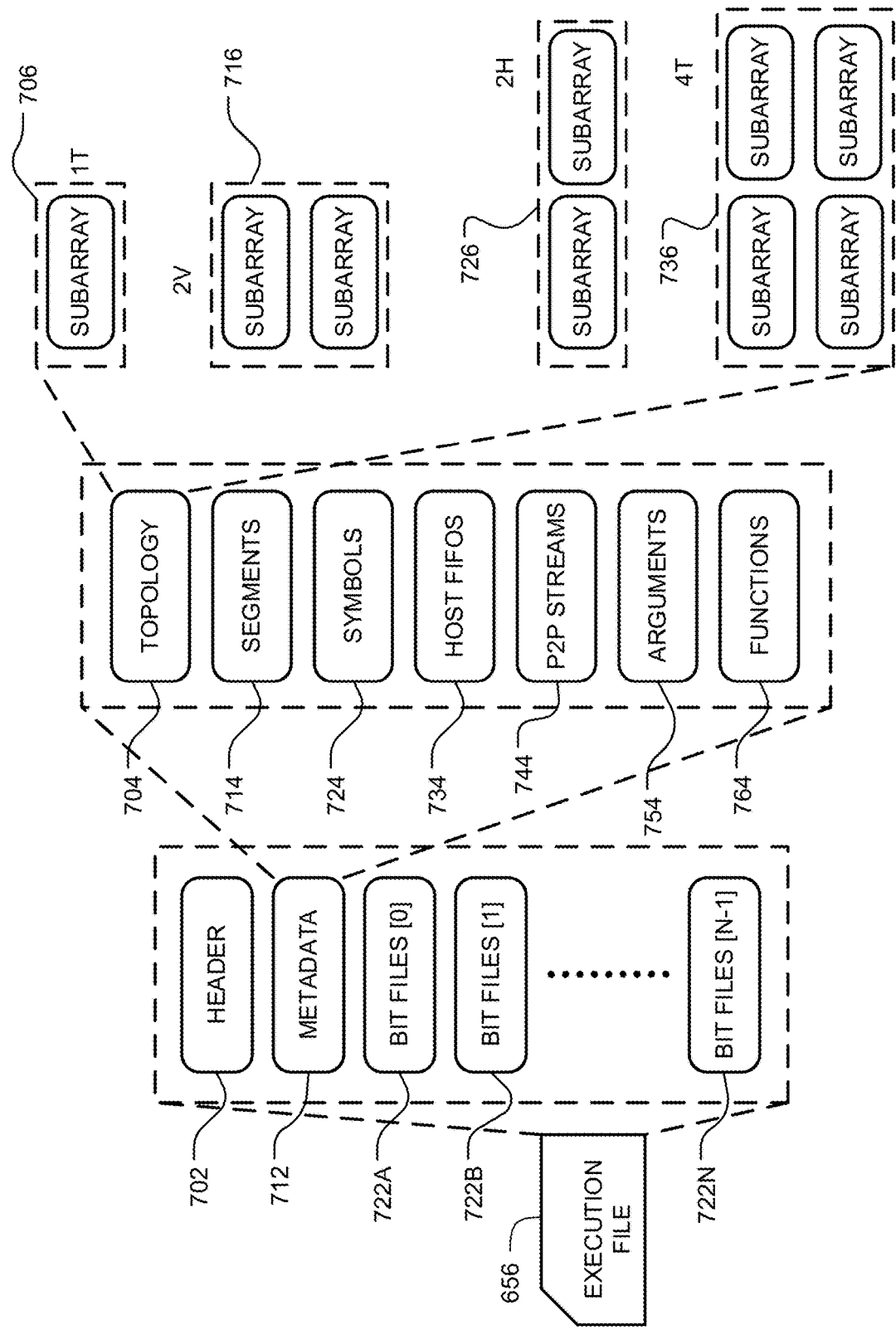
FIG. 7 is a diagram of an illustrative implementation of an execution file used by the technology disclosed to execute the applications on arrays of CGR units.

Turning to FIG. 7, the illustrative execution file 656 includes configuration files (e.g., configuration files 722*a*, 722*b*, . . . 722*n*). The configuration files are sometimes also referred to as bit files 722*a*, 722*b*, . . . 722*n* that implement the computation graphs 636 of the user applications 602 using the arrays of CGR units and the bus and CGR processor memory in the pool of reconfigurable data flow resources 678 of FIG. 6.

A program executable contains a bit-stream representing the initial configuration, or starting state, of each of the CGR units that execute the program. This bit-stream is referred to as a bit file, or hereinafter as a configuration file. The execution file 656 includes header 702 that indicates destinations on the reconfigurable processors for configuration data in the configuration files. In some implementations, a plurality of configuration files is generated for a single application.

The execution file 656 includes metadata 712 that accompanies the configuration files and specifies configurations of virtual data flow resources used to execute the applications 602. In one example, the execution file 656 can specify that a particular application uses an entire reconfigurable processor for execution, and as a result the metadata 712 identifies virtual data flow resources equaling at least the entire reconfigurable processor for loading and executing the configuration files for the particular application. In another example, the execution file 656 can specify that a particular application uses one or more portions of a reconfigurable processor for execution, and as a result the metadata 712 identifies virtual data flow resources equaling at least the one or more portions of the reconfigurable processor for loading and executing the configuration files for the particular application.

In yet another example, the execution file 656 can specify that a particular application uses an entire node for execution, and as a result the metadata 712 identifies virtual data flow resources equaling at least the entire node for loading and executing the configuration files for the particular application. In yet another example, the execution file 656 can specify that a particular application uses two or more nodes for execution, and as a result the metadata 712 identifies virtual data flow resources equaling at least the two or more nodes for loading and executing the configuration files for the particular application.

One skilled in the art would appreciate that the execution file 656 can similarly specify reconfigurable processors or portions thereof spanning across racks, pods, superpods, and zones in a data center, and as a result the metadata 712 identifies virtual data flow resources spanning across the racks, pods, superpods, and zones in the data center for loading and executing the configuration files for the particular application.

As part of the metadata 712, the execution file 656 includes topology information 704 that specifies orientation or shapes of portions of a reconfigurable processor for loading and executing the configuration files for a particular application.

In one implementation, a reconfigurable processor comprises a plurality of tiles of configurable units. Illustratively, a reconfigurable processor may include two tiles (e.g., the CGR architecture 300 of FIG. 3), each including a CGR array. If desired, a reconfigurable processor may include more than two tiles. For example, a reconfigurable processor may include four, eight, or sixteen tiles, or any other number of tiles that is not a power of two. The topology information 704 specifies an orientation of tiles in the plurality of tiles used to load and execute the configuration files for a particular application.

For example, when the particular application is allocated two tiles of the reconfigurable processor, the topology information 704 specifies whether the two tiles are arranged in a vertical orientation (2V) 716 or a horizontal orientation (2H) 726. If desired, the topology information 704 can allocate a single tile (1T) 706 of the reconfigurable processor to the particular application. In some implementations, the topology information 704 can allocate four tiles (4T) 736 of the reconfigurable processor to the particular application. In other implementations, other geometries may be specified, such as a group of three tiles.

The execution file 656 may specify virtual flow resources like PCIe channels, DMA channels, and DDR channels used to load and execute the configuration files for a particular application. The execution file 656 may specify virtual flow resources like main memory (e.g., off-chip/external DRAM), local secondary storage (e.g., local disks (e.g., HDD, SSD)), remote secondary storage (e.g., distributed file systems, web servers), latches, registers, and caches (e.g., SRAM) used to load and execute the configuration files for a particular application.

The execution file 656 may specify virtual memory segments 714 for the requested virtual flow resources, including virtual address spaces of the virtual memory segments and sizes of the virtual address spaces. The execution file 656 may specify symbols 724 (e.g., tensors, streams) used to load and execute the configuration files for a particular application. The execution file 656 may specify HOST FIFOs 734 accessed by the configuration files for a particular application during execution. The execution file 656 may specify peer-to-peer (P2P) streams 744 (e.g., data flow exchanges and control token exchanges between sources and sinks) exchanged between configurable units on which the configuration files for a particular application are loaded and executed. The execution file 656 may specify arguments 754 that modify execution logic of a particular application by supplying additional parameters or new parameter values to the configuration files for the particular application. The execution file 656 may specify functions 764 (e.g., data access functions like transpose, alignment, padding) to be performed by the configurable units on which the configuration files for a particular application are loaded and executed.

Figure 8:
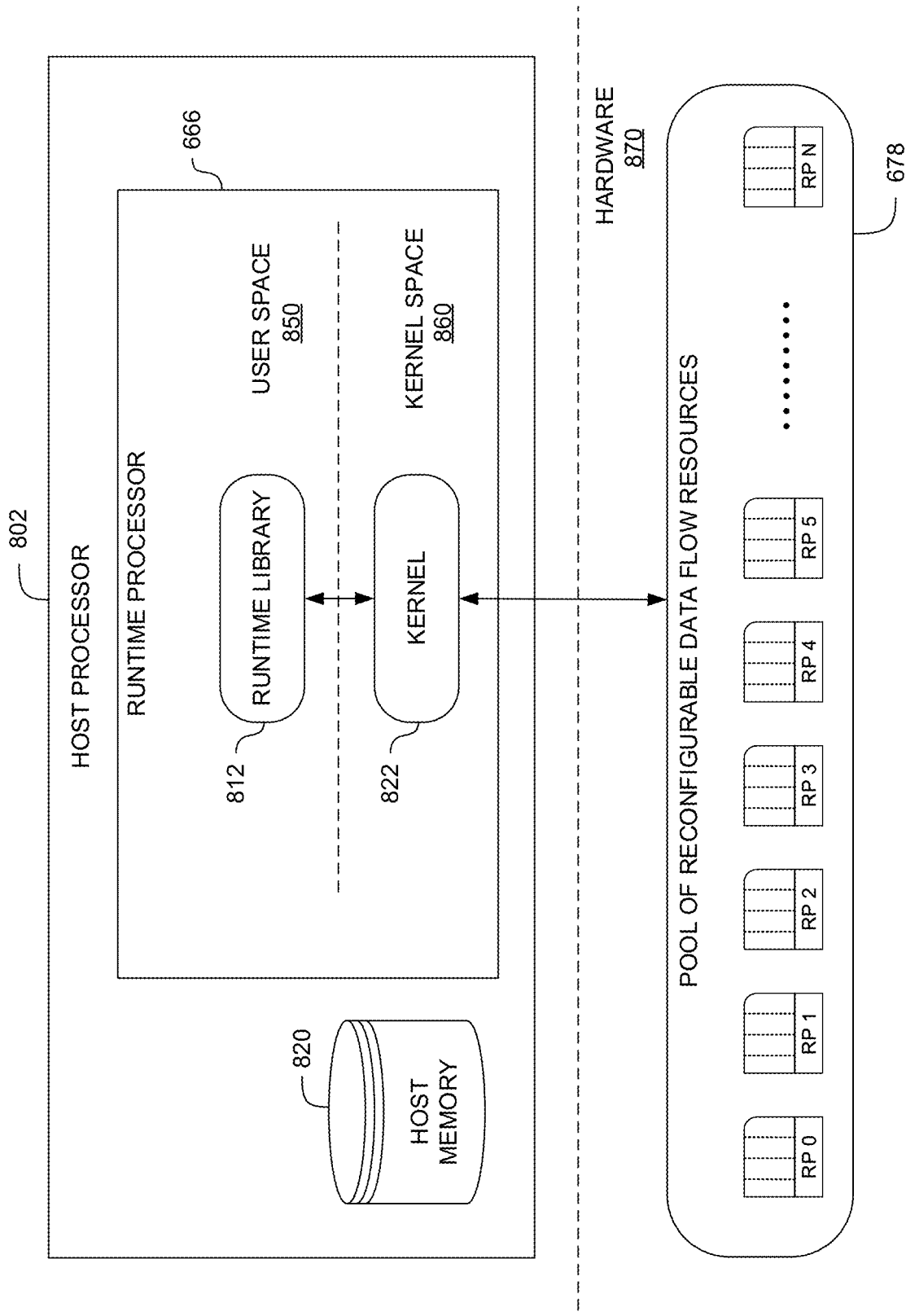
FIG. 8 is a diagram of an illustrative host processor that includes a runtime processor that is operatively coupled to the pool of reconfigurable data flow resources.

As illustratively shown in FIG. 8, the runtime processor 666 may be included in a host processor 802, which is operatively coupled to the pool of reconfigurable data flow resources 678 (e.g., via a PCIe interface). The host processor 802 runs the software components for user request, compute resource, and communication management. In one implementation, the host processor 802 uses a PCIe interface that manages reconfiguration of the CGR processor memory, the busses, and the arrays of CGR units in the pool of reconfigurable data flow resources 678 and movement of data into and out of the pool of reconfigurable data flow resources. A built-in arbiter guarantees fair communication bandwidth to every reconfigurable processor when multiple reconfigurable processors are communicating with the runtime processor 666.

The runtime processor 666 includes a runtime library 812 that runs in a user space 850 of the host processor 802. The runtime processor 666 includes a kernel module 822 that runs in a kernel space 860 of the host processor 802. The host processor 802 has host memory 820. In implementations disclosed herein, the runtime processor 666, based on virtual data flow resources requested in an execution file (e.g., execution file 656 of FIG. 6) for configuration files of a particular application (e.g., one of applications 602 of FIG. 6), allocates segments of the host memory 820 to a virtual machine that implements the particular application. In one implementation, the runtime processor 666 runs on top of Linux.

The runtime processor 666 partitions the physical hardware resources in the hardware space 870, i.e. the components in the pool of reconfigurable data flow resources, into multiple virtual resources, and provides uniform and coherent access to these virtual resources as being physical in a balanced and unified view. It also manages all interactions among the applications and their respective resources by handling the traffic of application requests for reconfigurable resources, memory, and I/O channels.

Figure 9:
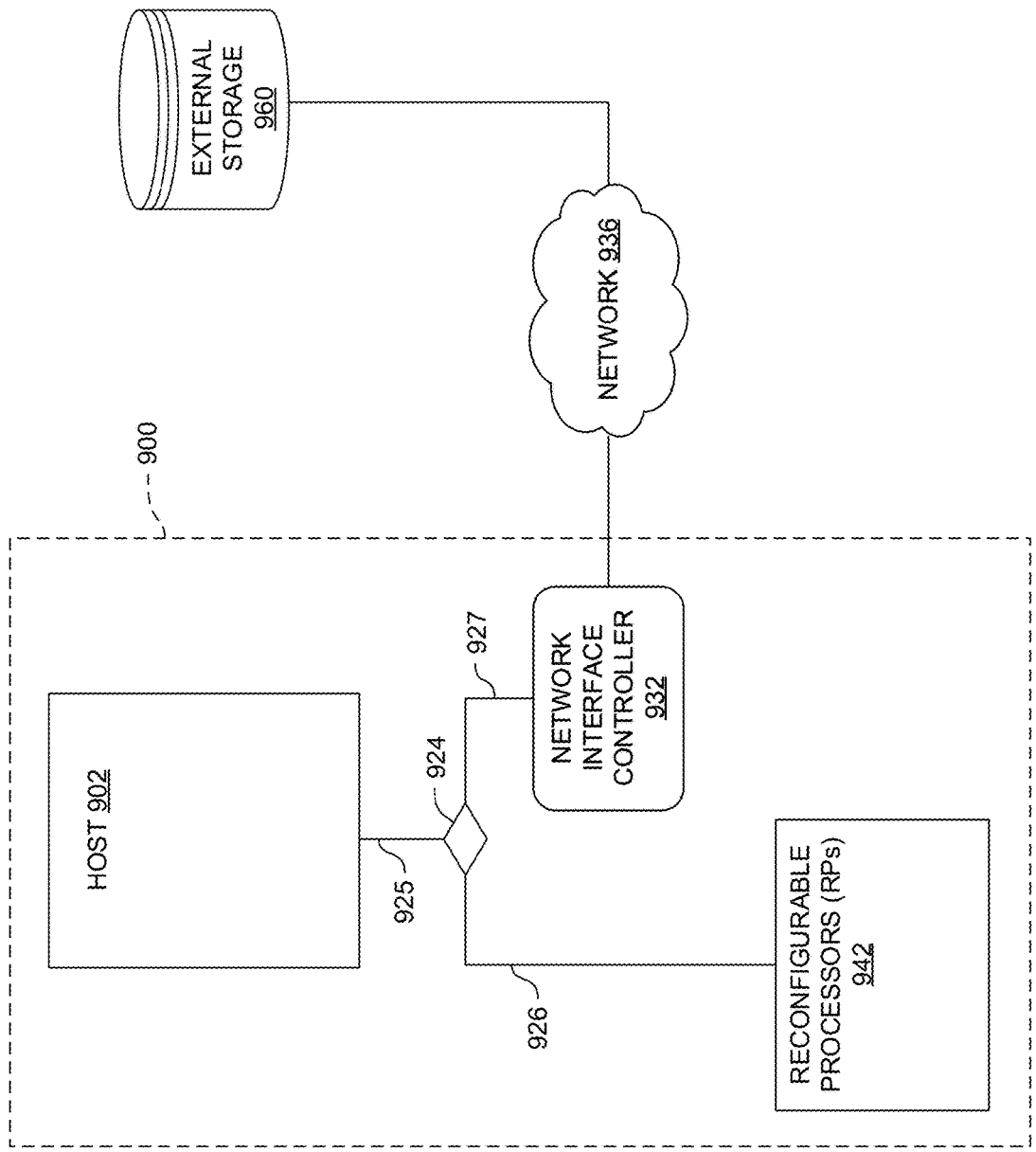
FIG. 9 is a diagram of an illustrative data processing system configured for providing direct access to external storage.

FIG. 9 is a diagram of an example data processing system 900 that provides direct data access to external storage 960. The data processing system 900 includes a bus switch 924, multiple local buses 925, 926, 927, a host processor 902, one or more reconfigurable processors 942, and a network interface controller 932 for connecting to the external storage 960 via a network 936 (also called herein "network fabric").

Examples of the network 936 include a Storage Area Network (SAN), a Local Area Network (LAN), and a Wide Area Network (WAN). The SAN can be implemented with a variety of data communications fabrics, devices, and protocols. For example, the fabrics for the SAN can include Fibre Channel, Ethernet, InfiniBand™, Serial Attached Small Computer System Interface ('SAS'), or the like. Data communication protocols for use with the SAN can include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like.

The LAN can also be implemented with a variety of fabrics, devices, and protocols. For example, the fabrics for the LAN can include Ethernet (e.g., 802.3), wireless (e.g., 802.11), or the like. Data communication protocols for use in the LAN can include Transmission Control Protocol ('TCP'), User Datagram Protocol ('UDP'), Internet Protocol (IP), Hypertext Transfer Protocol ('HTTP'), Wireless Access Protocol ('WAP'), Handheld Device Transport Protocol ('HDTP'), Session Initiation Protocol ('SIP'), Real-time Transport Protocol ('RTP'), or the like.

The external storage 960 may include any shared storage solution that is mounted over the network 936. As an example, the external storage 960 may be part of a file system's kernel module, which collectively is hereinafter also referred to as storage kernel modules. The file system's kernel module may include a server-client architecture and allows to transfer data between the one or more reconfigurable processors 942 (i.e., the client) and the external storage 960 (i.e., the server). The storage kernel module may support a Mellanox Infiniband (IB) protocol or an RDMA over Converged Ethernet (RoCE) protocol.

Illustratively, RoCE is a network protocol that allows remote direct memory access (RDMA) over an Ethernet network by encapsulating an InfiniBand (IB) transport packet over Ethernet. There are two RoCE versions, RoCE v1 and RoCE v2. RoCE v1 is an Ethernet link layer protocol and hence allows communication between any two host processors in the same Ethernet broadcast domain. RoCE v2 is an internet layer protocol which means that RoCE v2 packets can be routed.

The multiple local buses 925, 926, 927 may include a Peripheral Component Interconnect Express (PCIe) bus, a Cache Coherent Interconnect for Accelerators (CCIX) protocol bus, a Compute Express Link (CXL) connection, and/or an Open Coherent Accelerator Processor Interface (OpenCAPI).

The host processor 902 is coupled to a first local bus 925 of the multiple local buses, and the network interface controller (NIC), which is sometimes also referred to as a network interface card, is coupled to a second local bus 927 of the multiple local buses.

The one or more reconfigurable processors are each coupled to a different local bus 926 of the multiple local buses. By way of example, the one or more reconfigurable processors 942 are Coarse-Grained Reconfigurable Architecture (CGRA) devices. Each reconfigurable processor of the one or more reconfigurable processors 942 may include an array of configurable units (e.g., compute units and memory units) in a programmable interconnect fabric. The array of configurable units in the reconfigurable processor may be partitionable into a plurality of subarrays (or tiles) of configurable units. If desired, CGR processor 110 having arrays of CGR units 120 of FIG. 1 may implement the one or more reconfigurable processors 942.

The bus switch 924 couples the multiple local busses 925, 926, 927. Thus, the bus switch 924 operatively couples the one or more reconfigurable processors 942, the host processor 902, and the NIC 932.

The one or more reconfigurable processors 942 of data processing system 900 may be configured to implement a virtual function, and the virtual function uses a virtual address for a memory access operation. Illustratively, the host processor 902 is configured to implement an application programming interface (API) that translates the virtual address into a physical address. The NIC 932 uses the physical address to initiate a direct data access operation at the external storage 960. For example, the NIC 932 may include a direct memory access controller that generates memory addresses for the direct data access operation on the external storage 960 and initiates memory read and/or write operations.

The direct data access operation moves data directly between the one or more reconfigurable processors 942 and the external storage 960, such that the data bypasses the host processor 902 and is transferred directly between the one or more reconfigurable processors 942 and the NIC 932.

As an example, the direct data access operation is a direct data write access operation that moves the data directly from the one or more reconfigurable processors 942 over local bus 926, bus switch 924, local bus 927, NIC 932, and network 936 to the external storage 960. As another example, the direct data access operation is a direct data read access operation that moves the data directly from the external storage 960 via the network 936, the NIC 932, local bus 927, bus switch 924, and local bus 926 to the one or more reconfigurable processors 942.

In some implementations, the arrays of CGR units of the one or more reconfigurable processors 942 perform computational tasks in parallel to the sending and/or retrieving of the data.

In other implementations, the arrays of CGR units may stop the execution of a virtual function at a checkpoint and offload the current status of the arrays of CGR units of the one or more reconfigurable processors 942 that are involved in the execution of the virtual function.

Figure 10:
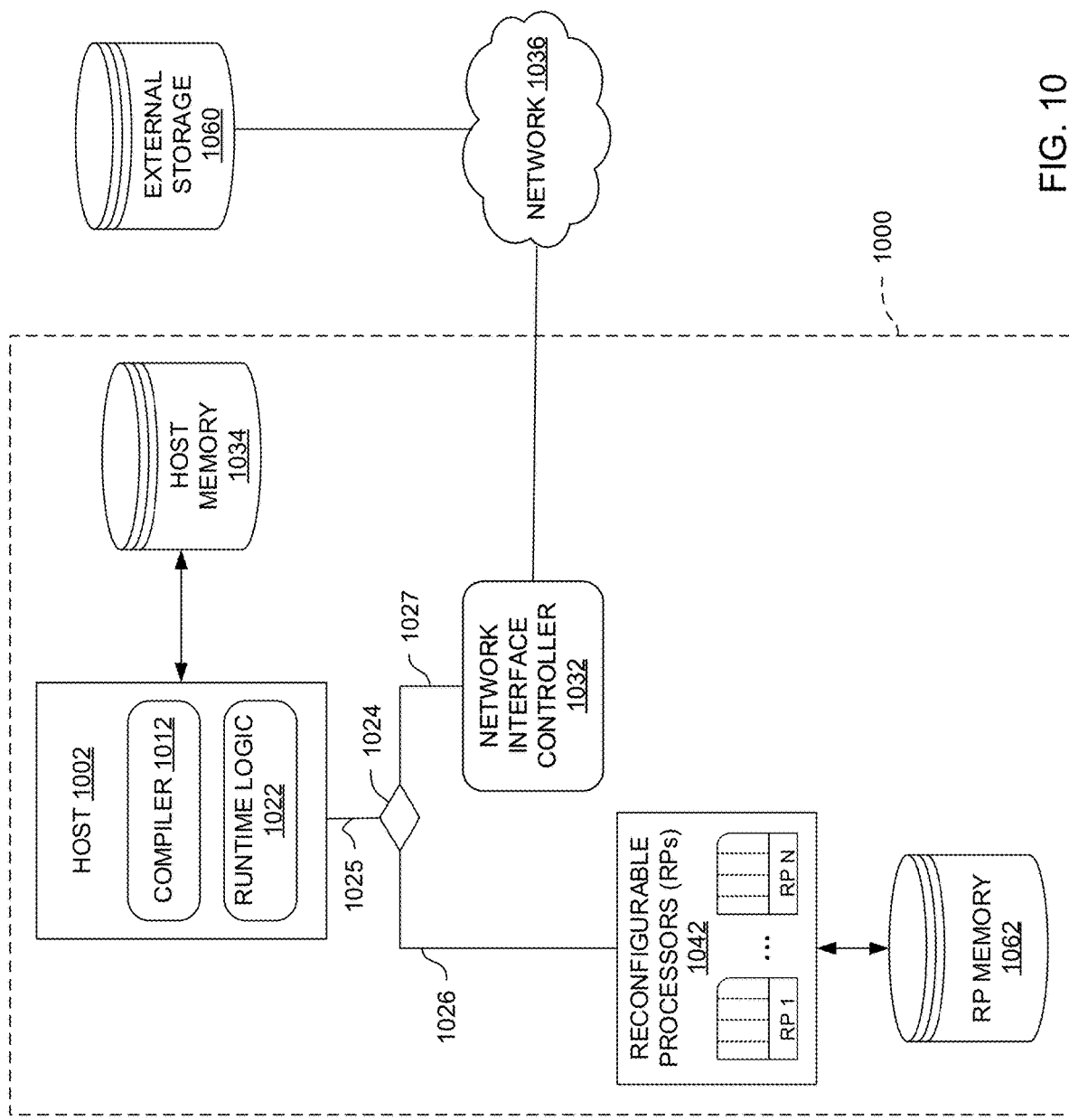
FIG. 10 is a diagram of an illustrative data processing system with more than one reconfigurable processor and attached reconfigurable processor memory.

FIG. 10 is a diagram of an illustrative data processing system 1000 with more than one reconfigurable processor 1042 and attached one or more reconfigurable processor memories 1062. As shown in FIG. 10, bus switch 1024 couples multiple local busses 1025, 1026, 1027, thereby operatively coupling the one or more reconfigurable processors 1042, the host processor 1002, and the NIC 1032.

The attached reconfigurable processor memories 1062 may include main memory such as dynamic random-access memory (DRAM), flash memory, magnetic disks (e.g., hard disk drive (HDD)), solid-state drives (SSD), optical disks, and/or any other memory type known in the art.

The one or more reconfigurable processors 1042 may interface with the one or more reconfigurable processor memories 1062 (e.g., a memory interface such as memory interface 139 of FIG. 1 may couple the one or more reconfigurable processors 1042 with the one or more reconfigurable processor memories 1062). In some implementations, each reconfigurable processor of the one or more reconfigurable processors 1042 may interface with a separate reconfigurable processor memory 1062. If desired, the reconfigurable processor memory 1062 may be in the same package and/or on the same die as the associated reconfigurable processor 1042. In other implementations, a single reconfigurable processor memory 1062 may be associated with the one or more reconfigurable processors 1042.

Illustratively, the host processor 1002 includes a compiler 1012. The compiler 1012 receives applications and generates for the applications a configuration file that is adapted to be executed on the one or more reconfigurable processors 1042. As shown in FIG. 10, the illustrative host processor 1002 may include runtime logic 1022. The runtime logic 1022 may be configured to provide on-demand access to the one or more reconfigurable processors 1042, for example to execute the compiled applications on the one or more reconfigurable processors 1042.

In some implementations, the runtime logic 1022 may configure the one or more reconfigurable processors 1042 of data processing system 1000 to implement a virtual function. The runtime logic 1022 may implement an application programming interface (API) for the translation of virtual addresses into physical addresses. For example, consider the scenario in which the local buses 1025, 1026, and 1027 are PCIe interfaces. In this scenario, the runtime logic 1022 may memory map the PCIe physical base address register region into its virtual address space to create the virtual to physical address mapping, and the storage kernel module may call into the API, which may calculate the physical address by adding the offset of the virtual address from the start of the virtual memory region to the start of the base address physical address.

The NIC 932 uses the physical address to initiate a direct data access operation at the external storage 960. For example, the NIC 932 may include a direct memory access controller that generates memory addresses for the direct data access operation on the external storage 960 and initiates memory read and/or write operations.

The direct data access operation moves data directly between the one or more reconfigurable processors 942 and the external storage 960, such that the data bypasses the host processor 902 and is transferred directly between the one or more reconfigurable processors 942 and the NIC 932.

The data processing system 1000 includes an API (e.g., in the NIC 1032) that is configured to enable sending of data from the one or more reconfigurable processors 1042 via the NIC 1032 to the external storage 1060 and/or retrieving of data from the external storage 1060 via the NIC 1032 for the one or more reconfigurable processors 1042, whereby the data bypasses the host processor 1002 and is transferred directly between the one or more reconfigurable processors 1042 and the NIC 1032. If desired, the API may include a direct memory access controller.

In some implementations, the API is configured to enable sending of additional data from the one or more reconfigurable processor memories 1062 via the NIC 1032 to the external storage 1060 and/or retrieving of additional data from the external storage 1060 via the NIC 1032 for the one or more reconfigurable processor memories 1062, whereby the data bypasses the host processor 1002 and the host processor memory 1034 and is transferred directly between the one or more reconfigurable processor memories 1062 and the NIC 1032.

Illustratively, the API is configured to enable the retrieving of the data in integer multiples of a block size (i.e., page size) of the external storage 1060. If desired, any amount of the data may be transferred at any given data transfer operation between the external storage 1060 and the one or more reconfigurable processors 1042 and/or the one or more reconfigurable processor memories 1062. Thus, the API is configured to enable retrieving of additional data from the external storage 1060 via the NIC 1032, whereby a size of the additional data is a non-integer multiple of the block size of the external storage 1060.

For example, consider the scenario in which the size of the additional data includes a whole number multiple portion of the block size of the external storage 1060 and a fractional number multiple portion of the block size of the external storage 1060. In this scenario, the whole number multiple portion of the block size of the additional data is transferred directly from the NIC 1032 to the one or more reconfigurable processors 1042 and/or the one or more reconfigurable processor memories 1062, thereby bypassing the host processor 1002 and the host memory 1034, while the fractional number multiple portion of the additional data is transferred in a buffered I/O transfer from the NIC 1032 to the host memory 1034 and from the host memory 1034 to the one or more reconfigurable processors 1042 and/or the one or more reconfigurable processor memories 1062.

In some scenarios, the one or more reconfigurable processors 1042 are configured to implement a virtual function that uses a virtual address for the retrieving of the data via the NIC 1036. In these scenarios, the API may translate the virtual address into a physical address for accessing the external storage 1060. The translation between a virtual address and a physical address is sometimes also referred to as address mapping or address unmapping or just mapping or unmapping.

Illustratively, the API that translates the virtual address into the physical address may include first and second arguments. The first argument of the API may include a list. The list is both, input and output parameter. If desired, each element in the list includes a virtual address page. The second argument of the API may include a number of elements in the list. If desired, a third argument may be an output parameter which is set to true if all the virtual addresses belong to the reconfigurable processor memory 1062 and false if not (i.e., the virtual addresses belong to host memory 1034).

In some implementations, the one or more reconfigurable processors 1042 may implement a fixed-sized memory-mapped region. The fixed-sized memory-mapped region may expose a virtually contiguous window to the one or more reconfigurable processor memories 1062. If desired, the virtually contiguous window is implemented using a list of physically discontinuous regions.

For example, the fixed-sized memory-mapped region may be implemented in the PCIe base address register 2 (BAR 2) region. By way of example, a table manager may minimize the number of page-table entries reprogrammed during the execution of an application using a stateful Least Recently Used (LRU) cache and allowing overlapping page offset to be served by the same window entry.

Alternatively, after a system boot, the data processing system initialization service may be able to dynamically discover the BAR2 size and use that to flexibly control window size and page-size in the table manager and support larger contiguous window entries, allowing for minimizing the number of contiguous data transfer operations.

However, in a non-trusted environment, exposing the reconfigurable processor memory 1062 via its PCIe BAR2 memory-mapped region directly to any third-party RDMA devices for performing a remote read/write operation can represent a security risk. With I/O Memory Management Unit (IOMMU) support, the application reserves the control to register/unregister only the trusted RDMA device(s) with its allocated reconfigurable processor(s) 1042 PCIe BAR2 memory-mapped region, by programming the IOMMU page-tables with an additional level of translation between I/O Virtual Address (IOVA) to Physical PCIe Address (PA). Thereby, a user VA may be translated to an IOVA, while programming the RDMA devices. The IOMMU tables on the host processor 1002 will translate IOVA to PA before issuing a read or a write request to the reconfigurable processor memory 1062 locally or remotely.

Figure 11:
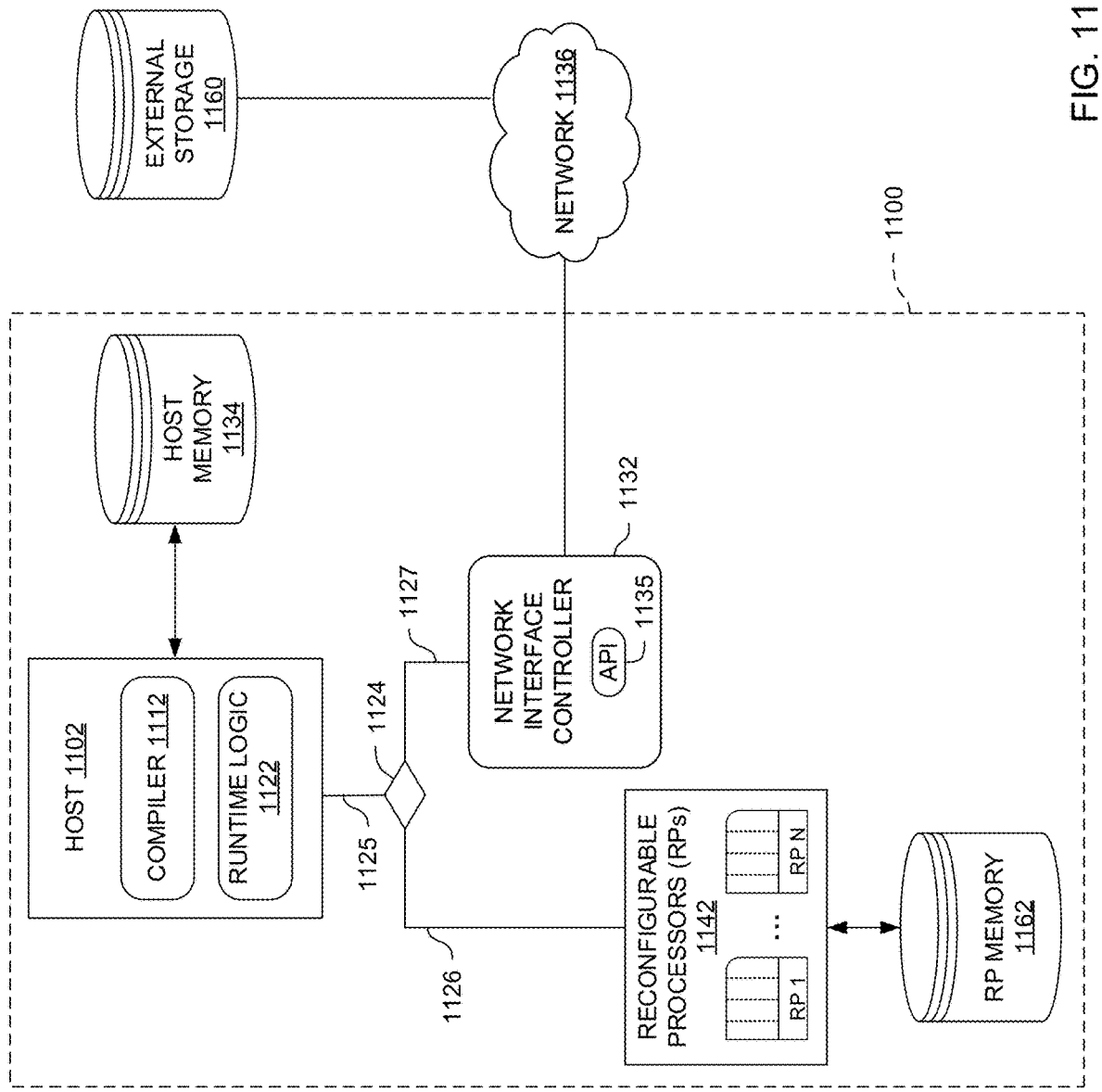
FIG. 11 is a diagram of an illustrative data processing system with a network interface controller (NIC) that includes an application programming interface (API) for performing direct data access operations.

FIG. 11 is a diagram of an illustrative data processing system 1100 with a host processor 1102 and associated host processor memory 1134, and a network interface controller (NIC) 1132 that includes an application programming interface (API) 1135. As shown in FIG. 11, bus switch 1124 couples multiple local busses 1125, 1126, 1127, thereby operatively coupling the one or more reconfigurable processors 1142, the host processor 1102, and the NIC 1132.

As an example, the one or more reconfigurable processors 1142 are configured to implement a virtual function that uses a virtual address for a memory access operation. The host processor 1102 is configured to implement an application programming interface (API) (e.g., in runtime logic 1122) that translates the virtual address into a physical address. The NIC 1132, and more particularly the API 1135 in the NIC 1132 uses the physical address to initiate a direct data access operation at the external storage 1160. The direct data access operation moves data directly between the one or more reconfigurable processors 1142 and the external storage 1160, whereby the data bypasses the host processor 1102 and is transferred directly between the one or more reconfigurable processors 1142 and the NIC 1132.

The direct data access operation may be a direct data write access operation that moves the data directly from the one or more reconfigurable processors 1142 to the external storage 1160.

If desired, the direct data access operation may be a direct data read access operation that moves the data directly from the external storage to the one or more reconfigurable processors.

Illustratively, at least some API 1135 (e.g., for initiating the direct data access operation) may be located in the NIC 1132. In some implementations, the data processing system 1000 may include multiple NICs such as NIC 1132, each being associated with one or more reconfigurable processors such as one or more reconfigurable processors 1142. In these implementations, an API may determine a NIC 1132 of the multiple NICs that achieves the lowest latency for a transfer of data between a reconfigurable processor 1142 or a reconfigurable processor memory 1162 and the external storage 1160.

If desired, the data processing system 1100 may include additional APIs for reducing the latency of a data transfer between the reconfigurable processor memory 1062 and the external storage 1060. The additional APIs may be located in the NIC 1132.

In some implementations, the API 1135 in the NIC 1132 may perform direct memory access (DMA) operations. For example, the NIC 1132 may be part of a PCIe bus. Thus, the NIC 1132 may act as a peer PCIe device of the one or more reconfigurable processors 1142 to form a peer-to-peer (P2P) DMA.

In some scenarios, the external storage 1160 may be a local storage such as a Non-Volatile Memory Express (NVMe) device. In such a scenario, a NVMe controller (e.g., a Non-Volatile Memory Host Controller Interface Specification (NVMHCIS)) may perform the direct memory access (DMA) operations during the transfer of data between the one or more reconfigurable processors 1142 and the external storage 1160, and the local file system may invoke the APIs 1135 such as the mapping and unmapping APIs.

As an example, consider the scenario in which a reconfigurable processor memory 1162 is associated with the one or more reconfigurable processor 1142. Consider further that the reconfigurable processor memory 1162 is connected to the memory controllers of the one or more reconfigurable processors 1142 and over a PCIe fabric to the NIC 1132. Thus, direct access from the APIs 1135 that implement the DMA engine in the NIC 1132 to the external storage 1160 transfers data from the external storage 1160 via the network 1136 to the NIC 1132 and over the PCIe bus from the NIC 1132 to the one or more reconfigurable processors 1142 and the reconfigurable processor memory 1162.

A read/write operation with a virtual address (e.g., an address of a buffer in reconfigurable processor memory 1162) may be handed off to the corresponding file system's kernel module, and the file system's kernel module may translate the virtual address to a physical address. The physical address may be provided to the API 1135 of the NIC 1132 for the DMA operation.

Illustratively, the host processor 1102 includes a compiler 1112. The compiler 1112 receives applications and generates for the applications a configuration file that is adapted to be executed on the one or more reconfigurable processors 1142. As shown in FIG. 11, the illustrative host processor 1102 may include runtime logic 1122. The runtime logic 1122 may be configured to provide on-demand access to the one or more reconfigurable processors 1142, for example to execute the compiled applications on the one or more reconfigurable processors 1042.

The runtime logic 1122 may be divided into a user space and a kernel space. The kernel space may include components such as a device driver, a resource manager, a scheduler, just to name a few.

Figure 12:
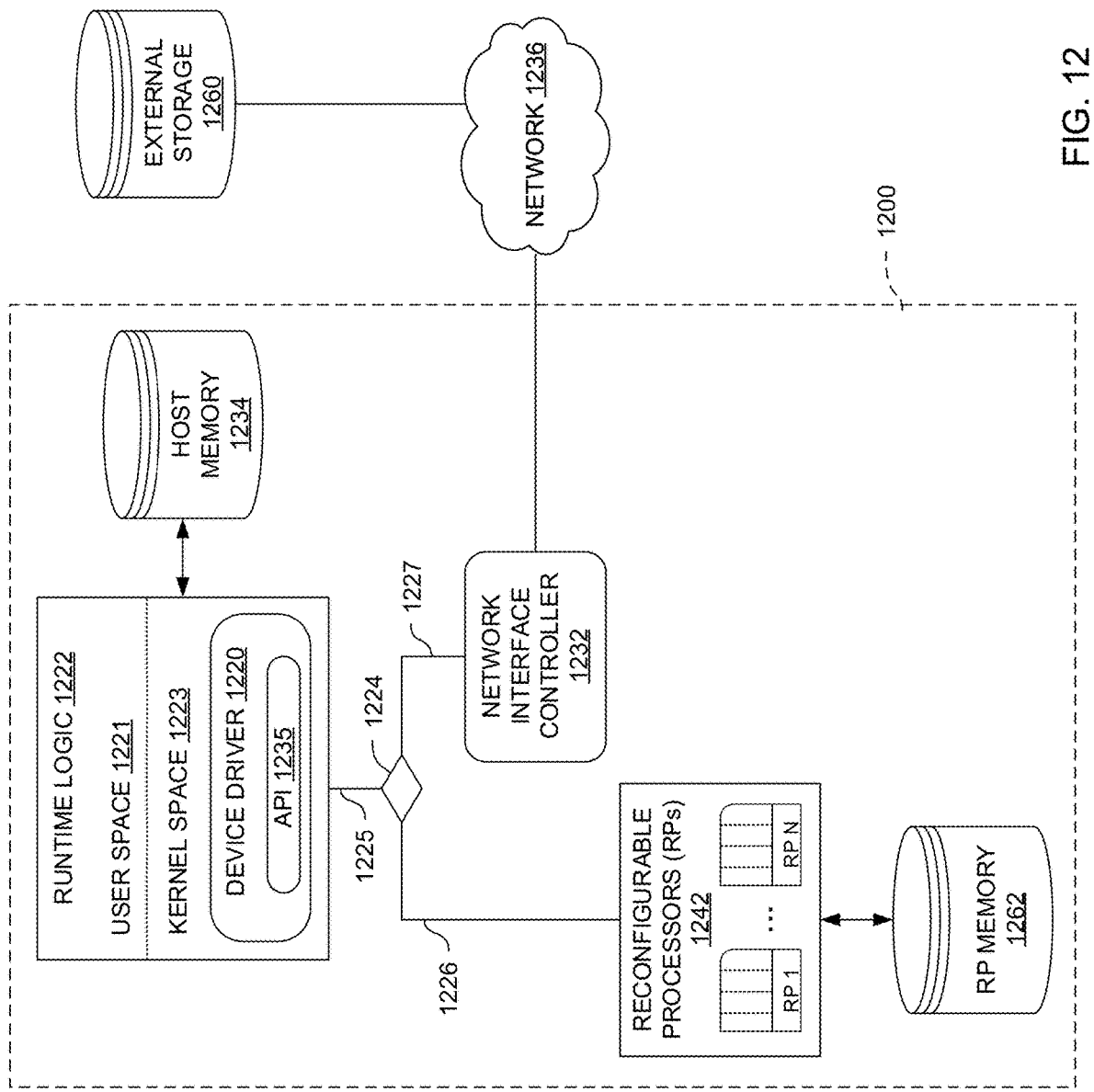
FIG. 12 is a diagram of an illustrative data processing system with an application programming interface (API) that is located in a device driver of runtime logic.

FIG. 12 is a diagram of an illustrative data processing system 1200 that includes runtime logic 1222, which may be located in a host processor, with a user space 1221 and a kernel space 1223. As shown in FIG. 12, the kernel space 1223 includes a device driver 1220.

The data processing system 1200 includes a bus switch 1224 that couples multiple local busses 1225, 1226, 1227, thereby operatively coupling one or more reconfigurable processors 1242, runtime logic 1222, and NIC 1232. NIC 1232 may couple the data processing system 1200 via a network 1236 with external storage 1260. If desired, a host memory 1234 may be associated with the runtime logic 1222, and a reconfigurable processor memory 1262 may be associated with the one or more reconfigurable processors 1242.

Illustratively, data processing system 1200 includes an API that is configured to enable sending of data from the one or more reconfigurable processors 1242 via the NIC 1232 and network 1236 to the external storage 1260 and/or retrieving of data from the external storage 1260 via the network 1236 and the NIC 1232 for the one or more reconfigurable processors 1242, whereby the data bypasses the host processor 1202 and is transferred directly between the one or more reconfigurable processors 1242 and the NIC 1232.

If desired, the application programming interface (API) 1235 is located in the device driver 1220 of runtime logic 1222.

If desired, the file system's kernel module, which collectively are hereinafter also referred to as storage kernel modules, may be located in the device driver 1220 of the runtime logic 1222. Thus, the actual translation between virtual and physical address may happen at the host processor side.

The storage kernel modules may invoke the virtual to physical address mapping API to get the virtual to physical address translation. Illustratively, the virtual to physical address translation may be organized as follows: When an application (e.g., a graph) starts execution on the one or more reconfigurable processors 1242, the graph calls into the device driver 1220 to memory map the PCIe physical base address register (BAR) region into its virtual address space and creates the virtual to physical mapping. When the storage kernel module calls into the map API above, the physical address of an associated virtual address is calculated by adding the offset of the virtual address from the start of the virtual memory region to the start of the BAR physical address and returns that in each scatter gather element of the list described above.

Data is transferred from external storage 1260 to PCIe device memory such as reconfigurable processor memory 1262 while bypassing the file buffer cache and thereby the host memory 1234. Bypassing the file buffer cache of the kernel may put a restriction on the amount of data that can be transferred at each data transfer operation between the external storage 1260 and the reconfigurable processor memory 1262 and/or the one or more reconfigurable processors 1242. For example, the amount of data to be transferred between the external storage 1260 and the reconfigurable processor memory 1262 and/or the one or more reconfigurable processors 1242 may be multiples of page size (i.e., multiples of the block size of the underlying external storage 1260), and the addresses have to page-align, and/or the file object has to page-align.

If desired, any amount of data may be transferred at any given data transfer operation between the external storage 1260 and the reconfigurable processor memory 1262 and/or the one or more reconfigurable processors 1242. Consider the scenario in which the amount of data to be transferred is not a multiple of the block size of the external storage 1260. In this scenario, a portion of the data to be transferred that includes a multiple of the block size of the external storage 1260 is transferred in directly between the external storage 1260 and the reconfigurable processor memory 1262 and/or the one or more reconfigurable processors 1242.

The remainder of the data to be transferred is doing a buffered I/O transfer. As an example, when doing a buffered I/O transfer for retrieving data from the external storage 1260, the remainder of the data to be transferred is first copied from the external storage 1260 to the host memory 1234 and from the host memory 1234 to the target memory (i.e., to the reconfigurable processor memory 1262). As another example, when doing a buffered I/O transfer for sending data from the reconfigurable processor memory 1262 or from the one or more reconfigurable processors 1242, the remainder of the data to be transferred is first copied from the reconfigurable processor memory 1262 and/or the one or more reconfigurable processors 1242 to the host memory 1234 and from the host memory 1234 to the target memory (i.e., to the external storage 1260) via the NIC 1232 and the network 1236.

Figure 13:
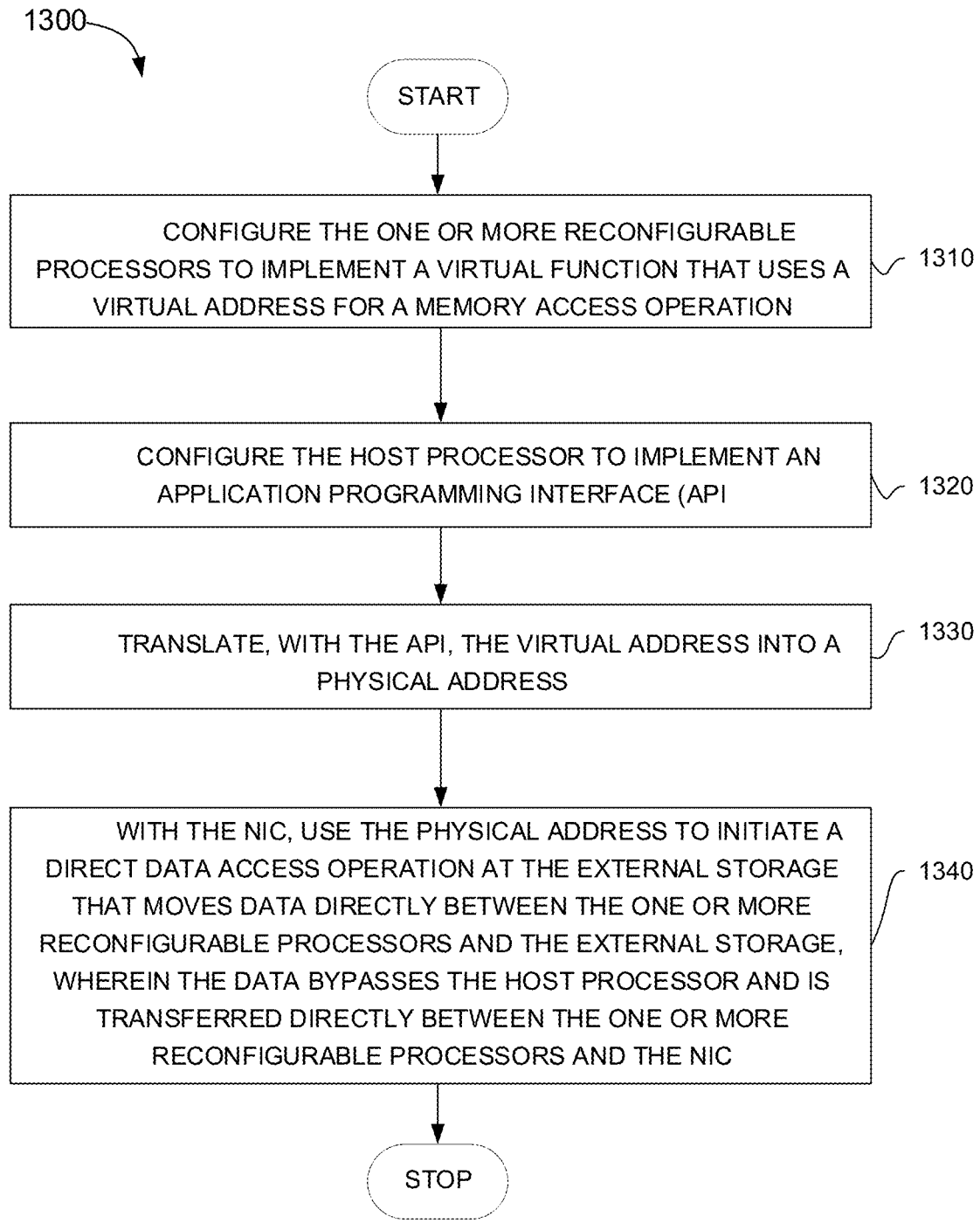
FIG. 13 is a flowchart showing illustrative operations that an application programming interface (API) may perform in a data processing system for a direct data access operation from a virtual function to external storage.

FIG. 13 is a flowchart 1300 showing illustrative operations in a data processing system. The data processing system comprises multiple local buses, a host processor coupled to a first local bus of the multiple local buses, a network interface controller (NIC) for connecting to the external storage via a network, wherein the NIC is coupled to a second local bus of the multiple local buses, one or more reconfigurable processors, each coupled to a different local bus of the multiple local buses, a bus switch that couples the multiple local busses, thereby operatively coupling the one or more reconfigurable processors, the host processor, and the NIC. Illustratively, the host processor may include runtime logic that performs the operations of FIG. 13.

During operation 1310, the runtime logic may configure the one or more reconfigurable processors to implement a virtual function that uses a virtual address for a memory access operation.

For example, runtime logic 1022 of FIG. 10 may configure the reconfigurable processors 1042 to implement a virtual function. The virtual function may use a virtual address for a memory access operation, if desired.

During operation 1320, the runtime logic may configure the host processor to implement an application programming interface (API).

For example, runtime logic 1022 of FIG. 10 may configure the host processor 1002 to implement a memory mapping between virtual and physical addresses.

During operation 1330, the runtime logic may translate, with the API, the virtual address into a physical address.

During operation 1340, the runtime logic may direct the NIC to use the physical address to initiate a direct data access operation at the external storage that moves data directly between the one or more reconfigurable processors and the external storage, wherein the data bypasses the host processor and is transferred directly between the one or more reconfigurable processors and the NIC.

For example, the runtime logic 1022 of FIG. 10 may invoke a direct memory access controller in the NIC 1032 such that the NIC 1032 uses the physical address to initiate a direct data access operation at the external storage 1060 that moves data directly between the one or more reconfigurable processors 1042 and the external storage 1060, whereby the data bypasses the host processor 1002 and is transferred directly between the one or more reconfigurable processors 1042 and the NIC 1032.

If desired, in an additional operation, the API may enable retrieval of the data in integer multiples of a block size of the external storage by transferring the data from the NIC directly to the reconfigurable processor. For example, the API 1235 in the device driver 1220 of FIG. 12 may enable retrieval of the data in integer multiples of a block size of the external storage 1260 by transferring the data from the NIC 1232 directly to the reconfigurable processor 1242.

In some scenarios, the data processing system may include a host memory that is coupled to the host processor and thereby to the API in the device driver of the runtime logic. In these scenarios, the API may enable retrieval of a fractional portion of the data by transferring the fractional portion of the data from the NIC to the host memory and from the host memory to the one or more reconfigurable processors.

For example, the API 1235 in the device driver 1220 of FIG. 12 may enable retrieval of a fractional portion of the data by transferring the fractional portion of the data from the NIC 1232 to the host memory 1234 and from the host memory 1234 to the one or more reconfigurable processors 1242.

If desired, the one or more reconfigurable processors may implement a virtual function that uses a virtual address for retrieving of the data via the NIC, and the API may translate the virtual address into a physical address for accessing the external storage.

For example, the one or more reconfigurable processors 1242 of FIG. 12 may implement a virtual function that uses a virtual address for retrieving of the data via the NIC 1232, and the API 1235 may translate the virtual address into a physical address for accessing the external storage 1260.

In some implementations, the multiple local busses are peripheral component interface express (PCIe) busses. In these implementations, the API may, for translating the virtual address into the physical address perform the operations of determining an offset of the virtual address from a start of an associated virtual memory region, and adding the offset to the start of the base address register's physical address.

If desired, the API may receive a first argument that comprises a list, wherein each element in the list comprises a virtual address page and receive a second argument that comprises a number of elements in the list.

In some scenarios, the data processing system further includes one or more reconfigurable processor memories that each interface with one of the one or more reconfigurable processors. In these scenarios, the API may receive a third argument that has a first value, if all virtual addresses belong to the one or more reconfigurable processor memories, and a second value that is different than the first value, if not all virtual addresses belong to the one or more reconfigurable processor memories.

If desired, a non-transitory computer-readable storage medium includes instructions that, when executed by a processing unit (e.g., host processor 1002 of FIG. 10), cause the processing unit to operate a system (e.g., data processing system 1000 of FIG. 10) by performing operation 1310 to 1340 of FIG. 13.

For example, a non-transitory computer-readable storage medium includes instructions that, when executed by a processing unit, cause the processing unit to operate a data processing system that comprises multiple local buses, a host processor coupled to a first local bus of the multiple local buses, a network interface controller (NIC) for connecting to the external storage via a network, wherein the NIC is coupled to a second local bus of the multiple local buses, one or more reconfigurable processors, each coupled to a different local bus of the multiple local buses, a bus switch that couples the multiple local busses, thereby operatively coupling the one or more reconfigurable processors, the host processor, and the NIC. The instructions may include configuring the one or more reconfigurable processors to implement a virtual function that uses a virtual address for a memory access operation; translating the virtual address into a physical address; and initiating a direct data access operation at the physical address of the external storage that moves data directly between the one or more reconfigurable processors and the external storage, wherein the data bypasses the host processor and is transferred directly between the one or more reconfigurable processors and the NIC.

Illustratively, the direct data access operation is a direct data write access operation that moves the data directly from the one or more reconfigurable processors to the external storage. If desired, the direct data access operation is a direct data read access operation that moves the data directly from the external storage to the one or more reconfigurable processors.

In some implementations, the instructions may include configuring the NIC and the runtime logic with APIs to enable transferring (sending or receiving) data between one or more reconfigurable processors and/or reconfigurable processor memories and external memory, configuring the one or more reconfigurable processors to execute a virtual function, executing the virtual function on the one or more reconfigurable processors, receiving a command to save a current checkpoint state, transferring the checkpoint state data from the one or more reconfigurable processors and/or the reconfigurable processor memories to external storage, receiving another command to restore the checkpoint state, and transferring the saved checkpoint state data from the external memory to the one or more reconfigurable processors and/or the reconfigurable processor memories.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

As will be appreciated by those of ordinary skill in the art, aspects of the presented technology may be embodied as a system, device, method, or computer program product apparatus. Accordingly, elements of the present disclosure may be implemented entirely in hardware, entirely in software (including firmware, resident software, micro-code, or the like) or in software and hardware that may all generally be referred to herein as a "apparatus," "circuit," "circuitry," "module," "computer," "logic," "FPGA," "unit," "system," or other terms. Furthermore, aspects of the presented technology may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of the present technology may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example 1 is a data processing system, comprising: multiple local buses; a host processor coupled to a first local bus of the multiple local buses; a network interface controller (NIC) for connecting to the external storage via a network, wherein the NIC is coupled to a second local bus of the multiple local buses; one or more reconfigurable processors, each coupled to a different local bus of the multiple local buses; and a bus switch that couples the multiple local busses, thereby operatively coupling the one or more reconfigurable processors, the host processor, and the NIC, wherein the one or more reconfigurable processors are configured to implement a virtual function that uses a virtual address for a memory access operation, wherein the host processor is configured to implement an application programming interface (API) that translates the virtual address into a physical address, and wherein the NIC uses the physical address to initiate a direct data access operation at the external storage that moves data directly between the one or more reconfigurable processors and the external storage, wherein the data bypasses the host processor and is transferred directly between the one or more reconfigurable processors and the NIC.

In Example 2, the one or more reconfigurable processors of Example 1 comprise arrays of coarse-grained reconfigurable (CGR) units.

In Example 3, the arrays of CGR units of the one or more reconfigurable processors of Example 2 perform computational tasks in parallel to the sending and/or retrieving of the data.

In Example 4, the host processor of Example 1 further comprises runtime logic with a user space and a kernel space, wherein the kernel space comprises a device driver, and wherein the API is located in the device driver.

In Example 5, the direct data access operation is a direct data write access operation that moves the data directly from the one or more reconfigurable processors to the external storage.

In Example 6, the direct data access operation is a direct data read access operation that moves the data directly from the external storage to the one or more reconfigurable processors.

In Example 7, the API that translates the virtual address into the physical address of Example 1 comprises a first argument that comprises a list, wherein each element in the list comprises a virtual address page; and a second argument that comprises a number of elements in the list.

In Example 8, the API of Example 1 is configured to enable the retrieving of the data in integer multiples of a block size of the external storage.

In Example 9, the data processing system of Example 8 further comprises a host memory that is coupled to the host processor, wherein the API is configured to enable retrieving of additional data from the external storage via the NIC, wherein a size of the additional data is a non-integer multiple of the block size of the external storage having a whole number portion and a fractional portion, wherein the whole number portion of the additional data is transferred directly from the NIC to the one or more reconfigurable processors, thereby bypassing the host processor and the host memory, and wherein the fractional portion of the additional data is transferred from the NIC to the host memory and from the host memory to the one or more reconfigurable processors.

In Example 10, the data processing system of Example 1 further comprises one or more reconfigurable processor memories that each interface with one of the one or more reconfigurable processors, and wherein the API is configured to enable sending of additional data from the one or more reconfigurable processor memories via the NIC to the external storage and/or retrieving of additional data from the external storage via the NIC for the one or more reconfigurable processor memories, wherein the data bypasses the host processor and is transferred directly between the one or more reconfigurable processor memories and the NIC.

In Example 11, the one or more reconfigurable processors of Example 10 implement a fixed-sized memory-mapped region that exposes a virtually contiguous window to the one or more reconfigurable processor memories.

In Example 12, the virtually contiguous window of Example 11 is implemented using a list of physically discontinuous regions.

Example 13 is a method of operating a data processing system that comprises multiple local buses, a host processor coupled to a first local bus of the multiple local buses, a network interface controller (NIC) for connecting to the external storage via a network, wherein the NIC is coupled to a second local bus of the multiple local buses, one or more reconfigurable processors, each coupled to a different local bus of the multiple local buses, a bus switch that couples the multiple local busses, thereby operatively coupling the one or more reconfigurable processors, the host processor, and the NIC, the method comprising: configuring the one or more reconfigurable processors to implement a virtual function that uses a virtual address for a memory access operation; configuring the host processor to implement an application programming interface (API); translating, with the API, the virtual address into a physical address; and with the NIC, using the physical address to initiate a direct data access operation at the external storage that moves data directly between the one or more reconfigurable processors and the external storage, wherein the data bypasses the host processor and is transferred directly between the one or more reconfigurable processors and the NIC.

In Example 14, the method of Example 13 further comprises enabling, with the API, retrieval of the data in integer multiples of a block size of the external storage by transferring the data from the NIC directly to the one or more reconfigurable processors.

In Example 15, the data processing system of Example 14 further comprises a host memory that is coupled to the host processor, and the method further comprises enabling, with the NIC, retrieval of a fractional portion of the data by transferring the fractional portion of the data from the NIC to the host memory and from the host memory to the one or more reconfigurable processors.

In Example 16, the direct data access operation of Example 13 is one of a direct data write access operation that moves the data directly from the one or more reconfigurable processors to the external storage or a direct data read access operation that moves the data directly from the external storage to the one or more reconfigurable processors.

In Example 17, the multiple local busses of Example 13 are peripheral component interface express (PCIe) busses, and wherein translating, with the API, the virtual address into the physical address further comprises determining an offset of the virtual address from a start of an associated virtual memory region; and adding the offset to the start of the base address register's physical address.

In Example 18, translating, with the API, the virtual address into the physical address of Example 17 further comprises receiving, with the API, a first argument that comprises a list, wherein each element in the list comprises a virtual address page; and receiving, with the API, a second argument that comprises a number of elements in the list.

In Example 19, the data processing system of Example 17 further comprises one or more reconfigurable processor memories that each interface with one of the one or more reconfigurable processors, and the method further comprises receiving, with the API, a third argument that has a first value, if all virtual addresses belong to the one or more reconfigurable processor memories, and a second value that is different than the first value, if not all virtual addresses belong to the one or more reconfigurable processor memories.

Example 20 is a non-transitory computer-readable storage medium including instructions that, when executed by a processing unit, cause the processing unit to operate a data processing system that comprises multiple local buses, a host processor coupled to a first local bus of the multiple local buses, a network interface controller (NIC) for connecting to the external storage via a network, wherein the NIC is coupled to a second local bus of the multiple local buses, one or more reconfigurable processors, each coupled to a different local bus of the multiple local buses, a bus switch that couples the multiple local busses, thereby operatively coupling the one or more reconfigurable processors, the host processor, and the NIC, the instructions comprising: configuring the one or more reconfigurable processors to implement a virtual function that uses a virtual address for a memory access operation; translating the virtual address into a physical address; and initiating a direct data access operation at the physical address of the external storage that moves data directly between the one or more reconfigurable processors and the external storage, wherein the data bypasses the host processor and is transferred directly between the one or more reconfigurable processors and the NIC.

What is claimed is:

1. A data processing system configured for providing direct access to external storage, comprising:
    multiple local buses;
    a host processor coupled to a first local bus of the multiple local buses;
    a network interface controller (NIC) for connecting to the external storage via a network, wherein the NIC is coupled to a second local bus of the multiple local buses;
    one or more reconfigurable processors, each coupled to a different local bus of the multiple local buses; and
    a bus switch that couples the multiple local busses, thereby operatively coupling the one or more reconfigurable processors, the host processor, and the NIC,
    wherein the one or more reconfigurable processors are configured to implement a virtual function that uses a virtual address for a memory access operation, wherein the host processor is configured to implement an application programming interface (API) that translates the virtual address into a physical address, wherein the API is configured to enable the retrieving of data in integer multiples of a block size of the external storage, and wherein the NIC uses the physical address to initiate a direct data access operation at the external storage that moves the data directly between the one or more reconfigurable processors and the external storage, wherein the data bypasses the host processor and is transferred directly between the one or more reconfigurable processors and the NIC.

2. The data processing system of claim 1, wherein the one or more reconfigurable processors comprise arrays of coarse-grained reconfigurable (CGR) units.

3. The data processing system of claim 2, wherein the arrays of CGR units of the one or more reconfigurable processors perform computational tasks in parallel to the sending and/or retrieving of the data.

4. The data processing system of claim 1, wherein the host processor further comprises:
    runtime logic with a user space and a kernel space, wherein the kernel space comprises a device driver, and wherein the API is located in the device driver.

5. The data processing system of claim 1, wherein the direct data access operation is a direct data write access operation that moves the data directly from the one or more reconfigurable processors to the external storage.

6. The data processing system of claim 1, wherein the direct data access operation is a direct data read access operation that moves the data directly from the external storage to the one or more reconfigurable processors.

7. The data processing system of claim 1, wherein the API that translates the virtual address into the physical address comprises:
    a first argument that comprises a list, wherein each element in the list comprises a virtual address page; and
    a second argument that comprises a number of elements in the list.

8. The data processing system of claim 1, further comprising:
    a host memory that is coupled to the host processor, wherein the API is configured to enable retrieving of additional data from the external storage via the NIC, wherein a size of the additional data is a non-integer multiple of the block size of the external storage having a whole number portion and a fractional portion, wherein the whole number portion of the additional data is transferred directly from the NIC to the one or more reconfigurable processors, thereby bypassing the host processor and the host memory, and wherein the fractional portion of the additional data is transferred from the NIC to the host memory and from the host memory to the one or more reconfigurable processors.

9. The data processing system of claim 1, further comprising:
    one or more reconfigurable processor memories that each interface with one of the one or more reconfigurable processors, and wherein the API is configured to enable sending of additional data from the one or more reconfigurable processor memories via the NIC to the external storage and/or retrieving of additional data from the external storage via the NIC for the one or more reconfigurable processor memories, wherein the data bypasses the host processor and is transferred directly between the one or more reconfigurable processor memories and the NIC.

10. The data processing system of claim 9, wherein the one or more reconfigurable processors implement a fixed-sized memory-mapped region that exposes a virtually contiguous window to the one or more reconfigurable processor memories.

11. The data processing system of claim 10, wherein the virtually contiguous window is implemented using a list of physically discontinuous regions.

12. A method of operating a data processing system that comprises multiple local buses, a host processor coupled to a first local bus of the multiple local buses, a network interface controller (NIC) for connecting to the external storage via a network, wherein the NIC is coupled to a second local bus of the multiple local buses, one or more reconfigurable processors, each coupled to a different local bus of the multiple local buses, a bus switch that couples the multiple local busses, thereby operatively coupling the one or more reconfigurable processors, the host processor, and the NIC, the method comprising:
 configuring the one or more reconfigurable processors to implement a virtual function that uses a virtual address for a memory access operation;
 configuring the host processor to implement an application programming interface (API);
 translating, with the API, the virtual address into a physical address;
 with the NIC, using the physical address to initiate a direct data access operation at the external storage that moves data directly between the one or more reconfigurable processors and the external storage, wherein the data bypasses the host processor and is transferred directly between the one or more reconfigurable processors and the NIC; and
 with the API, retrieving the data in integer multiples of a block size of the external storage by transferring the data from the NIC directly to the one or more reconfigurable processors.

13. The method of claim 12, wherein the data processing system further comprises a host memory that is coupled to the host processor, the method further comprising:
 enabling, with the NIC, retrieval of a fractional portion of the data by transferring the fractional portion of the data from the NIC to the host memory and from the host memory to the one or more reconfigurable processors.

14. The method of claim 12, wherein the direct data access operation is one of a direct data write access operation that moves the data directly from the one or more reconfigurable processors to the external storage or a direct data read access operation that moves the data directly from the external storage to the one or more reconfigurable processors.

15. The method of claim 12, wherein the multiple local busses are peripheral component interface express (PCIe) busses, and wherein translating, with the API, the virtual address into the physical address further comprises:
 determining an offset of the virtual address from a start of an associated virtual memory region; and
 adding the offset to the start of the base address register's physical address.

16. The method of claim 15, wherein translating, with the API, the virtual address into the physical address further comprises:
 receiving, with the API, a first argument that comprises a list, wherein each element in the list comprises a virtual address page; and
 receiving, with the API, a second argument that comprises a number of elements in the list.

17. The method of claim 15, wherein the data processing system further comprises one or more reconfigurable processor memories that each interface with one of the one or more reconfigurable processors, further comprising:
 receiving, with the API, a third argument that has a first value, if all virtual addresses belong to the one or more reconfigurable processor memories, and a second value that is different than the first value, if not all virtual addresses belong to the one or more reconfigurable processor memories.

18. A non-transitory computer-readable storage medium including instructions that, when executed by a processing unit, cause the processing unit to operate a data processing system that comprises multiple local buses, a host processor coupled to a first local bus of the multiple local buses, a network interface controller (NIC) for connecting to the external storage via a network, wherein the NIC is coupled to a second local bus of the multiple local buses, one or more reconfigurable processors, each coupled to a different local bus of the multiple local buses, a bus switch that couples the multiple local busses, thereby operatively coupling the one or more reconfigurable processors, the host processor, and the NIC, the instructions comprising:
 configuring the one or more reconfigurable processors to implement a virtual function that uses a virtual address for a memory access operation;
 translating the virtual address into a physical address;
 initiating a direct data access operation at the physical address of the external storage that moves data directly between the one or more reconfigurable processors and the external storage, wherein the data bypasses the host processor and is transferred directly between the one or more reconfigurable processors and the NIC; and
 retrieving the data in integer multiples of a block size of the external storage by transferring the data from the NIC directly to the one or more reconfigurable processors.

* * * * *